US011871017B2

(12) United States Patent
Xu et al.

(10) Patent No.: US 11,871,017 B2
(45) Date of Patent: Jan. 9, 2024

(54) VIDEO DATA PROCESSING

(71) Applicant: Tencent Technology (Shenzhen) Company Limited, Guangdong (CN)

(72) Inventors: Shishen Xu, Shenzhen (CN); Jingran Wu, Shenzhen (CN); Jun Zhao, Shenzhen (CN); Juncheng Ma, Shenzhen (CN); Yaqing Li, Shenzhen (CN); Chengjie Tu, Shenzhen (CN); Liang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/723,857

(22) Filed: Apr. 19, 2022

(65) Prior Publication Data

US 2022/0248040 A1 Aug. 4, 2022

Related U.S. Application Data

(63) Continuation of application No. PCT/CN2020/126740, filed on Nov. 5, 2020.

(30) Foreign Application Priority Data

Feb. 24, 2020 (CN) ........................ 202010112208.8

(51) Int. Cl.
*H04N 19/40* (2014.01)
*H04N 19/136* (2014.01)
*H04N 19/154* (2014.01)

(52) U.S. Cl.
CPC ........... *H04N 19/40* (2014.11); *H04N 19/136* (2014.11); *H04N 19/154* (2014.11)

(58) Field of Classification Search
CPC .... H04N 19/40; H04N 19/136; H04N 19/154; H04N 19/126; H04N 19/17
See application file for complete search history.

(56) References Cited

U.S. PATENT DOCUMENTS

2006/0238445 A1 10/2006 Wang et al.
2011/0051808 A1* 3/2011 Quast ...................... H04N 7/18 375/E7.085

(Continued)

FOREIGN PATENT DOCUMENTS

CN 101583036 A 11/2009
CN 103024445 A 4/2013

(Continued)

OTHER PUBLICATIONS

Chinese Office Action dated Aug. 15, 2022 in Application No. 202010112208.8 with Concise English Translation, 7 pages.

(Continued)

*Primary Examiner* — Tracy Y. Li
(74) *Attorney, Agent, or Firm* — ARENTFOX SCHIFF LLP

(57) ABSTRACT

A video data processing method is provided. In the method, video features of a target video are acquired. The video features include background features and key part region features. An expected quality of a key part of the target video is acquired. The expected quality of the key part corresponds to an image quality of the key part in a transcoded target video after the target video is transcoded. A background prediction transcoding parameter of the target video is determined based on the background features and an expected quality of a background. The expected quality of the background corresponds to an overall image quality of the transcoded target video. A target transcoding parameter prediction value is determined based on the background features, the key part region features, and the background prediction transcoding parameter. The target video is transcoded according to the target transcoding parameter prediction value.

20 Claims, 10 Drawing Sheets

(56) References Cited

U.S. PATENT DOCUMENTS

| | | | | |
|---|---|---|---|---|
| 2014/0185667 | A1 | 7/2014 | Mcphillen et al. | |
| 2015/0016510 | A1* | 1/2015 | Carlsson | H04N 19/198 375/240.03 |
| 2016/0173882 | A1* | 6/2016 | Mishra | H04N 19/426 375/240.08 |
| 2017/0337711 | A1* | 11/2017 | Ratner | H04N 19/119 |
| 2018/0376153 | A1 | 12/2018 | Gokhale et al. | |
| 2020/0045285 | A1* | 2/2020 | Varerkar | H04N 19/597 |
| 2020/0365134 | A1* | 11/2020 | Tu | G10L 15/04 |
| 2021/0168408 | A1* | 6/2021 | Malakhov | H04N 19/167 |
| 2021/0258588 | A1* | 8/2021 | Xie | G06F 16/78 |

FOREIGN PATENT DOCUMENTS

| | | | |
|---|---|---|---|
| CN | 110022463 | A | 4/2013 |
| CN | 103220550 | A | 7/2013 |
| CN | 105306960 | A | 2/2016 |
| CN | 108600863 | A | 9/2018 |
| CN | 109729384 | A | 5/2019 |
| CN | 111277827 | A | 6/2020 |
| GB | 2353655 | A | 2/2001 |
| JP | 2008532429 | A | 8/2008 |
| KR | 101978922 | B1 | 5/2019 |
| TW | 201545537 | A | 12/2015 |
| WO | 2006094001 | A2 | 9/2006 |

OTHER PUBLICATIONS

Ming Li, et al., Rate control using the rate distortion properties of the foreground and background regions, Journal of Chongqing University, vol. 34, No. 12, Dec. 15, 2011, Chongqing, China, pp. 1-6.

Supplementary European Search Report dated Nov. 23, 2022 in Application No. 20921120.0, 10 pages.

Hung-Ju Lee et al: "Scalable Rate Control for MPEG-4 Video" , IEEE Transactions on Circuits and Systems for Video Technology, IEEE, USA, vol. 10, No. 6, Sep. 1, 2000.

International Search Report and Written Opinion for PCT/CN2020/126740, dated Jan. 28, 2021, 13 pages, English translation included.

Office Action in JP2022533403, dated Oct. 3, 2023, 3 pages.

* cited by examiner

VIDEO DATA PROCESSING

RELATED APPLICATIONS

This application is a continuation of International Application No. PCT/CN2020/126740 entitled "VIDEO DATA PROCESSING METHOD AND APPARATUS, DEVICE, AND READABLE STORAGE MEDIUM" and filed on Nov. 5, 2020, which claims priority to Chinese Patent Application No. 202010112208.8, entitled "VIDEO DATA PROCESSING METHOD AND APPARATUS, DEVICE, AND READABLE STORAGE MEDIUM" and filed on Feb. 24, 2020. The entire disclosures of the prior applications are hereby incorporated by reference in their entirety.

FIELD OF THE TECHNOLOGY

This application relates to the field of computer technologies, including video data processing.

BACKGROUND OF THE DISCLOSURE

With the development of broadcasting technologies and network video applications, videos have become an important part in people's daily life. For example, people can use the videos for learning or entertainment. To adapt to different network bandwidths, different terminal processing capabilities, and different user requirements, video transcoding is usually required.

For the video transcoding, overall content of a video is mainly considered. Based on the overall content of the video, video features are extracted, then a bit rate of the video under a target quality is predicted according to the video features, and then the video is transcoded according to the predicted bit rate.

SUMMARY

Embodiments of this disclosure include a video data processing method and apparatus, a device, and a non-transitory computer-readable storage medium, which can improve the quality of the key part region after video transcoding.

One aspect of the embodiments of this disclosure provides a video data processing method. In the method, video features of a target video are acquired. The video features include background features and key part region features. An expected quality of a key part of the target video is acquired. The expected quality of the key part corresponds to an image quality of the key part in a transcoded target video after the target video is transcoded. A background prediction transcoding parameter of the target video is determined based on the background features and an expected quality of a background. The expected quality of the background corresponds to an overall image quality of the transcoded target video. A target transcoding parameter prediction value is determined based on the background features, the key part region features, and the background prediction transcoding parameter. The target video is transcoded according to the target transcoding parameter prediction value.

One aspect of the embodiments of this disclosure provides a video data processing apparatus that includes processing circuitry. The processing circuitry is configured to acquire video features of a target video. The video features include background features and key part region features. The processing circuitry is configured to acquire an expected quality of a key part of the target video. The expected quality of the key part corresponds to an image quality of the key part in a transcoded target video after the target video is transcoded. The processing circuitry is configured to determine a background prediction transcoding parameter of the target video based on the background features and an expected quality of a background. The expected quality of the background corresponds to an overall image quality of the transcoded target video. The processing circuitry is configured to determine a target transcoding parameter prediction value based on the background features, the key part region features, and the background prediction transcoding parameter. Further, the processing circuitry is configured to transcode the target video according to the target transcoding parameter prediction value.

One aspect of the embodiments of this disclosure provides a computer device, including: a processor and a memory, the memory storing a computer program, the computer program, when executed by the processor, causing the processor to perform the method in the embodiments of this disclosure.

One aspect of the embodiments of this disclosure provides a non-transitory computer-readable storage medium, storing instructions which when executed by a processor cause the processor to perform the video data processing method.

BRIEF DESCRIPTION OF THE DRAWINGS

To describe technical solutions in the embodiments of this disclosure, the following briefly introduces the accompanying drawings. The accompanying drawings in the following description show merely some embodiments of this disclosure\.

DESCRIPTION OF EMBODIMENTS

The technical solutions in embodiments of this disclosure are described below with reference to the accompanying drawings in the embodiments of this disclosure. The described embodiments are merely some rather than all of the embodiments of this disclosure.

For video transcoding, overall content of a video is mainly considered. Based on the overall content of the video, video features are extracted, then a bit rate of the video under a target quality is predicted according to the video features, and then the video is transcoded according to the predicted bit rate. Although such a method can control the quality of the whole frame image of the video, it is difficult to control the quality of some regions in the video (e.g., a face region). Therefore, the quality of some regions in the video after transcoding may not be high.

By acquiring background features, key part region features, a background prediction transcoding parameter, and an expected quality of a key part of a target video, a target transcoding parameter prediction value satisfying an expected quality of a background and matched with the expected quality of the key part can be obtained according to the background features, key part region features, and background prediction transcoding parameter of the target video. Because region-level features of the key part are newly added to take specific details of the key part region in the target video into consideration, a predicted target transcoding parameter prediction value can be more adapted to the key part region. Therefore, by transcoding the target video according to the target transcoding parameter prediction value, the quality of the key part region of the transcoded target video can satisfy the expected quality of the key part. That is, the quality of the key part region after the video transcoding can be improved.

Figure 1:
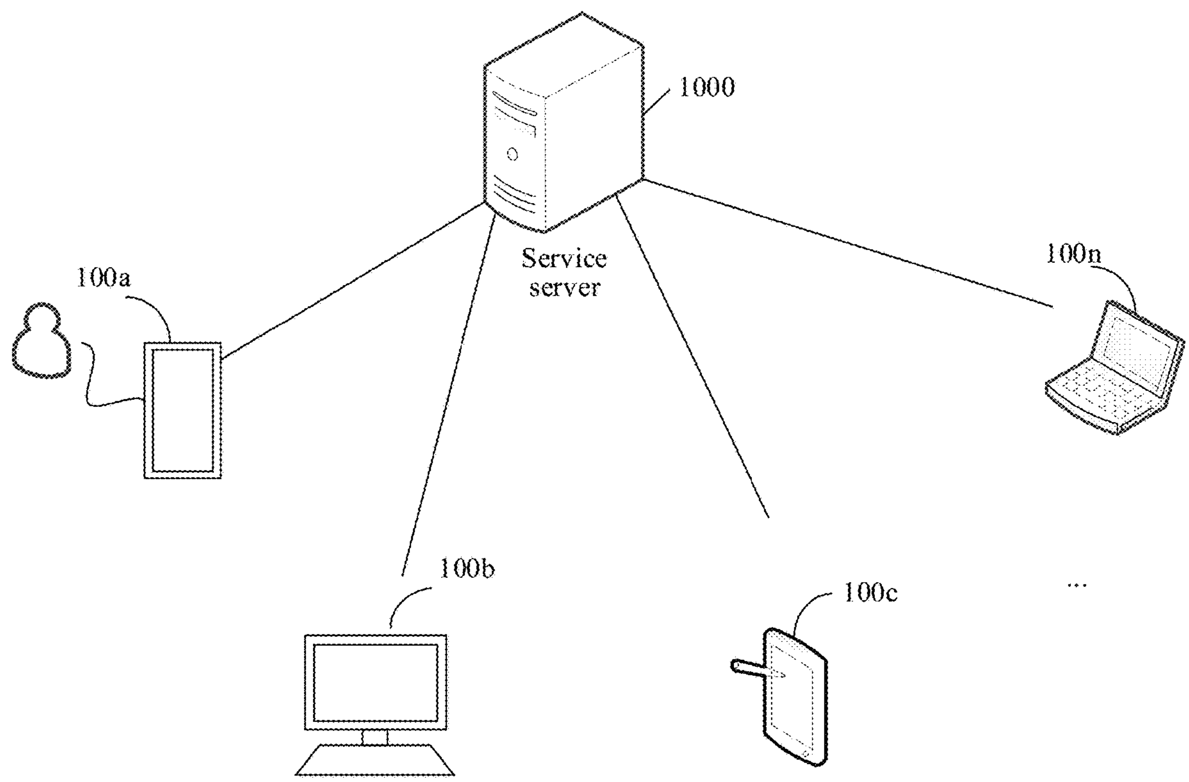
FIG. 1 is an exemplary structural diagram of a network architecture according to an embodiment of this disclosure.

FIG. 1 is an exemplary structural diagram of a network architecture according to an embodiment of this disclosure. As shown in FIG. 1, the network architecture may include a service server 1000 and a user terminal cluster. The user terminal cluster may include a plurality of user terminals, as shown in FIG. 1, and may specifically include a user terminal 100*a*, a user terminal 100*b*, a user terminal 100*c*, . . . , and a user terminal 100*n*. Each user terminal corresponds to a backend server, and each backend server can be connected to the service server 1000 via a network, so that the each user terminal can perform data exchange with the service server 1000 through the backend server, and the service server 1000 can conveniently receive service data from the each user terminal.

As shown in FIG. 1, each user terminal may be integrated with a target application. When the target application runs in each user terminal, the backend server corresponding to each user terminal can store service data in the application, and perform data exchange with the service server 1000 shown in FIG. 1. The target application may include an application with a function of displaying data information such as a text, an image, an audio, and a video. The target application may be a service processing application in fields such as automation, and may be used for automatically processing data inputted by a user. For example, the target application may be a video playback application in an entertainment application.

In this embodiment of this disclosure, one user terminal may be selected as a target user terminal from the plurality of user terminals. The target user terminal may include: a smartphone, a tablet computer, a desktop computer, or another smart terminal with functions of displaying and playing data information. For example, the user terminal 100*a* shown in FIG. 1 may be used as the target user terminal, and the target user terminal may be integrated with the foregoing target application. In this case, a backend server corresponding to the target user terminal can perform data exchange with the service server 1000. For example, taking the user terminal 100*a* as an example, if a user A intends to transcode a target video, and hopes that the quality of a key part after transcoding (i.e., the expected quality of the key part) is 90, the user A may upload the target video in the target application of the user terminal 100*a*, and the backend server of the user terminal 100*a* may send the target video and the expected quality of the key part to the service server 1000. The service server 1000 can obtain video features of the target video (including background features and key part region features). According to the background features of the target video, the service server 1000 may predict the background prediction transcoding parameter of the target video. The background prediction transcoding parameter is matched with the expected quality of the background. According to the background features, the key part region features, and the background prediction transcoding parameter, the service server 1000 may determine a target transcoding parameter prediction value matched with the expected quality of the key part, transcode the target video according to the target transcoding parameter prediction value, and return the transcoded target video to the backend server of the user terminal 100*a*, so that the user terminal 100*a* can display the transcoded target video, and the user A can watch the transcoded target video.

In some embodiments, the service server 1000 may further collect a large number of videos in the backend server, obtain video features of the videos, determine a transcoding parameter prediction value corresponding to each video according to the video features, transcode the video according to the transcoding parameter prediction value, and put the transcoded video into a video stream. In this way, the transcoded video can be played for the user when the user subsequently binge-watches the video by using the user terminal.

In some embodiments, it is to be understood that, the backend server may further acquire the video features of the target video and the expected quality of the key part, and predict the target transcoding parameter prediction value matched with the expected quality of the key part according to the video features. For an exemplary implementation of the backend server predicting the target transcoding parameter prediction value, reference may be made to the foregoing description of the service server 1000 predicting the target transcoding parameter prediction value. Details are not repeated herein again.

It is to be understood that, the methods provided in the embodiments of this disclosure may be performed by a computer device, and the computer device includes but is not limited to a terminal or a server.

Figure 2:
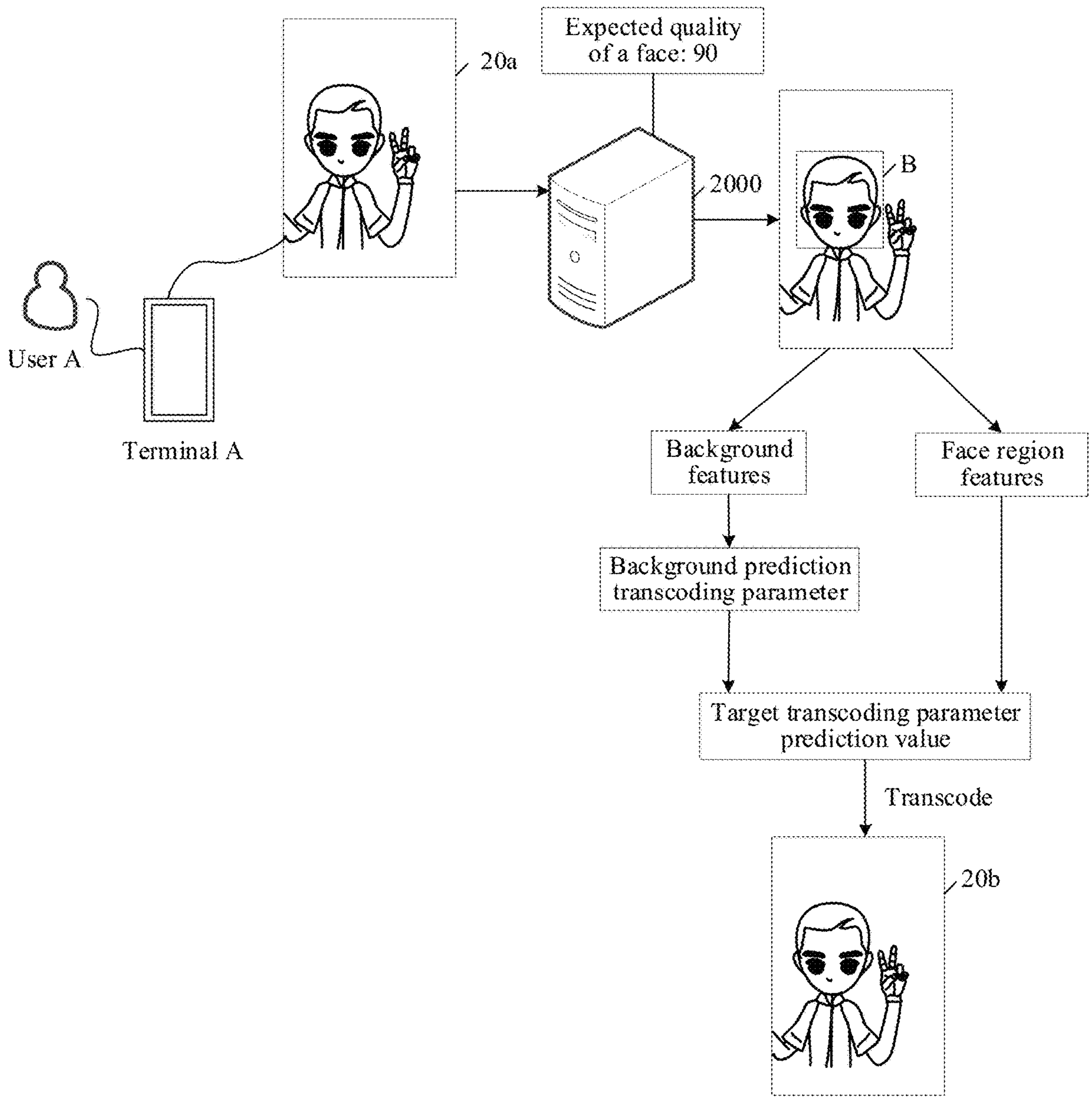
FIG. 2 is an exemplary diagram of a scenario of determining a target transcoding parameter prediction value according to an embodiment of this disclosure.

Further, for ease of understanding, refer to FIG. 2, which is an exemplary diagram of a scenario of determining a target transcoding parameter prediction value according to an embodiment of this disclosure. As shown in FIG. 2, a user A may upload a video 20*a* through a target application of a terminal A, and input an expected quality of a key part as 90, where the key part herein may refer to a human face. A backend server of the terminal A may send the video 20*a* and the expected quality of 90 of the key part of the video 20*a* (e.g., an expected quality of a human face) to a service server 2000. The service server 2000 may input the video 20*a* into a feature encoder, and determine a key part region (e.g., a face region) of the video 20*a* as a region B in the feature encoder. The service server 2000 may pre-encode the video 20*a* in the feature encoder according to an obtained feature encoding parameter, to obtain background features of the video 20*a*. The video is a continuous image sequence, including continuous video frames, and a video frame is an image. The "pre-encoding" herein may mean that image attribute information (e.g., a resolution, a frame rate, a bit rate, an image quality, and the like) of the video frames in the video 20*a* is counted in the feature encoder. The service server 2000 can obtain the video frames of the video 20*a*, then determine a video frame including a key part as a key video frame in the video frames, and pre-encode the key video frame and the key part region in the feature encoder according to the feature encoding parameter, so that key part region features (e.g., face region features) of the video 20*a* can be obtained. The service server 2000 may obtain a background prediction transcoding parameter according to the background features. According to the background prediction transcoding parameter, the background features and the key part region features, the service server 2000 may determine a target transcoding parameter prediction value matched with the expected quality of 90 of the key part. Subsequently, when the service server 2000 transcodes the video 20*a*, a transcoding parameter in configuration options may be set as the target transcoding parameter prediction value. Therefore, a transcoded video 20*b* is obtained, and the quality of the key part region of the video 20*b* matches the expected quality of the key part.

Figure 3:
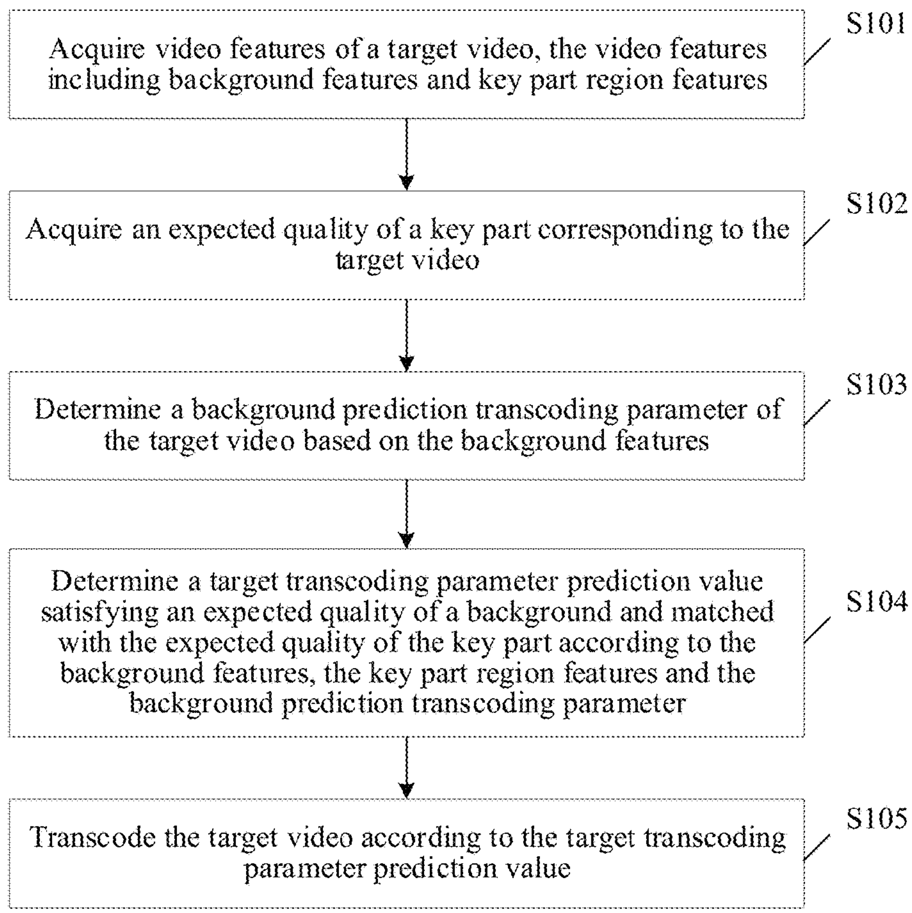
FIG. 3 is an exemplary flowchart of a video data processing method according to an embodiment of this disclosure.

Further, FIG. 3 is an exemplary flowchart of a video data processing method according to an embodiment of this disclosure. As shown in FIG. 3, the method may include the following steps.

In step S101, video features of a target video are acquired, the video features including background features and key part region features.

In this embodiment of this disclosure, the video features may include background features and key part region features. The key part may refer to a component part belonging to an object, and the key part region may refer to a region including the key part. The object may refer to an animal (e.g., a human, a cat, a dog, or the like), a plant (e.g., a tree, a flower, or the like), a building (e.g., a shopping mall, a residential building, or the like), or the like. When the object is an animal, the key part may be a face, a hand, a leg, or another part. When the object is a plant, for example, the object is a tree, the key part may be a leaf, a branch or another part. That is to say, the key part may be of different types for different objects. The video features may be obtained by a feature encoder by pre-encoding the target video according to a fixed feature encoding parameter. The background features may be obtained by pre-encoding the target video according to the feature encoding parameter. The key part region features may be obtained by pre-encoding the key part region in the target video according to the feature encoding parameter. That is to say, the background features are obtained from the overall content of the video including the key part region. The key part region features are obtained from the key part region in the target video. The background features are rougher than the key part region features, but can represent the overall content of the video. The key part region features can only represent the key part region, and are more specific than the background features. That is, the key part region features may include more detailed features in the key part region.

The background features may be a resolution, a bit rate, a frame rate, a reference frame, a peak signal to noise ratio (PSNR), a structural similarity index (SSIM), video multi-method assessment fusion (VMAF) and other frame-level image features. The key part region features may be a PSNR of the key part region, an SSIM of the key part region, VMAF of the key part region, a key part frame number ratio of the number of key video frames in which the key part appears to the total number of video frames, a key part area ratio of the area of the key part region in a key video frame in which the key part appears to the total area of the key video frame, an average bit rate of the key part region, or the like.

It is to be understood that, when the target video is inputted into the feature encoder, the feature encoder may pre-encode the video frames of the target video, to determine the resolution, bit rate, frame rate and reference frame of the target video, and count three feature values: a PSNR, SSIM, and VMAF of each video frame, then determine average values respectively corresponding to the PSNR, SSIM and VMAF according to the number of the video frames, and use average values of the resolution, bit rate, frame rate, reference frame, PSNR, SSIM and VMAF as background features of the target video. For example, the VMAF is adopted, and there are three video frames in a target video. The three video frames are a video frame A, a video frame B and a video frame C respectively. After the feature encoder pre-encodes the three video frames, VMAF of 80 of the video frame A, VMAF of 80 of the video frame B, and VMAF of 90 of the video frame C are obtained. Then, according to the total number of 3 of the video frame A, video frame B and video frame C, a final value of the target video on the VMAF feature can be obtained as (80+80+90)/3=83.3. In the feature encoder, a video frame in which a key part appears may be determined as a key video frame, a key part region is determined in the key video frame, the key video frame and the key part region are pre-encoded, and three feature values: a PSNR, SSIM and VMAF of the key part region in each key video frame are counted. Then, according to the number of key video frames, an average value of each feature value is determined as the key part region feature of the target video. In addition, according to the number of key video frames and the total number of video frames of the target video, a key part frame number ratio may be obtained, and the key part frame number ratio can be used as the key part region features of the target video. According to the area of the key part region in each key video frame and the total area of the key video frame, a key part area ratio of a single key video frame may be obtained. Then, according to the total number of the key video frames, a final value of the key part area ratio can be obtained, and the final value of the key part area ratio can be used as the key part region features of the target video. For example, provided that there are three video frames in the target video, the three video frames are a video frame A, a video frame B and a video frame C, respectively. The video frame A and the video frame B are key video frames (i.e., a key part appears in both the video frame A and the video frame B). Then, according to the number of 2 of the key video frame A and the key video frame B and the total number of 3 of the video frames of the target video, a key part frame number ratio can be obtained as 2/3=66.7%. The area of the key part region in the key video frame A is 3, and the total area of the key video frame A is 9, so the key part area ratio of the key video frame A is 33.3%. The area of the key part region in the key video frame B is 2, and the total area of the key video frame B is 8, so the key part area ratio of the key video frame B is 25%. According to the total number of 2 of key video frames (1 key video frame A+1 key video frame B), a final value of the key part area ratio can be obtained as (33.3%+25%)/2=29.2%, and the key part frame number ratio of 66.7% and the key part area ratio of 29.2% may also be used as the key part region features of the target video.

In step S102, an expected quality of a key part corresponding to the target video is acquired.

In this embodiment of this disclosure, the expected quality of the key part may refer to an expected value of an image quality of a key part in a transcoded target video after transcoding the target video. The expected quality of the key part may be a manually specified value, or may be a value randomly generated by a server according to the range of the quality manually inputted.

In step S103, a background prediction transcoding parameter of the target video is determined based on the background features.

In this embodiment of this disclosure, a transcoding parameter may refer to a configuration option parameter when transcoding the target video. That is to say, the transcoding parameter may be used for transcoding the target video, and the transcoding parameter may include but is not limited to a bit rate, a frame rate, a reference frame, or the like. The background prediction transcoding parameter corresponds to an expected quality of a background. According to the background features, a background prediction transcoding parameter matched with the expected quality of the background can be obtained. That is to say, the background prediction transcoding parameter is a parameter applicable to the overall content of the target video. By transcoding the target video according to the background prediction transcoding parameter, the overall quality of the transcoded target video matches the expected quality of the background. The expected quality of the background may refer to an expected value of the overall image quality of the transcoded target video after transcoding the target video. The expected quality of the background may be a manually specified value, or may be a value randomly generated by a server according to the range of the quality manually inputted.

In step S104, a target transcoding parameter prediction value matched with the expected quality of the key part is determined according to the background features, the key part region features, and the background prediction transcoding parameter.

In this embodiment of this disclosure, the target transcoding parameter prediction value corresponds to the expected quality of the key part. By inputting the background prediction transcoding parameter, the background features, and the key part region features into a transcoding parameter prediction model together, a fusion feature can be generated through a fully connected layer of the transcoding parameter prediction model. The background features, the key part region features, and the background prediction transcoding parameter may include M features in total. The fusion feature herein may mean that each of the background features, each of the key part region features, and the background prediction transcoding parameter are all used as input values to be simultaneously inputted into the transcoding parameter prediction model, that is, values of the M features are inputted into the transcoding parameter prediction model. Through the fully connected layer of the transcoding parameter prediction model, the values of the M features can be fused to output N initial transcoding parameter prediction values. M and N are both integers greater than 0, and a value of N depends on the number of key part quality standard values in a key part quality standard value set, that is, the value of N is consistent with the number of key part quality standard values. The key part quality standard value set herein is the range of the quality inputted into the transcoding parameter prediction model before inputting the video features into the transcoding parameter prediction model, which can be used for the transcoding parameter prediction model to determine the number of outputted initial transcoding parameter prediction values according to the number of key part quality standard values in the key part quality standard value set, and determine an initial transcoding parameter prediction value to be outputted based on the key part quality standard values.

Subsequently, the key part quality standard value set is acquired. The key part quality standard value set includes at least two key part quality standard values, and the key part quality standard values may refer to prediction values of the image quality of the key part region in the transcoded target video after transcoding the target video. The key part quality standard values may be manually specified values, or may be at least two values randomly generated by a server based on a manually given range. For example, provided that the manually given range is between 80 and 100, the server may randomly select at least two values from the values between 80 and 100. For example, provided that the selected values are 85, 88, 92 and 96, the four values (such as 85, 88, 92, and 96) may all be used as the key part quality standard values, and {85, 88, 92, 96} is used as the key part quality standard value set. According to the number of key part quality standard values in the key part quality standard value set and the foregoing fusion feature, an initial transcoding parameter prediction value corresponding to each key part quality standard value can be determined.

Figure 4:
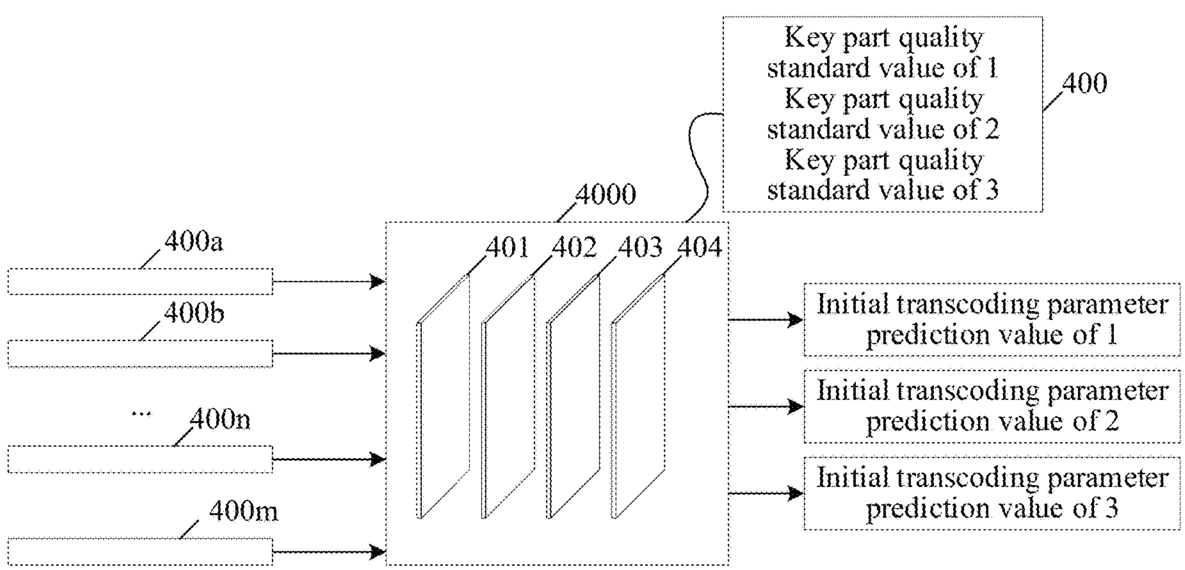
FIG. 4 is an exemplary diagram of outputting an initial transcoding parameter prediction value through a transcoding parameter prediction model according to an embodiment of this disclosure.

For ease of understanding, refer to FIG. 4, which is an exemplary diagram of outputting an initial transcoding parameter prediction value through a transcoding parameter prediction model according to an embodiment of this disclosure. As shown in FIG. 4, the background features and the key part region features may be a feature 400*a*, a feature 400*b*, . . . , and a feature 400*n*. A total of M input values of the feature 400*a*, the feature 400*b*, . . . , and the feature 400*n*, and a background prediction transcoding parameter 400*m* are inputted into a transcoding parameter prediction model 4000. The transcoding parameter prediction model includes an input layer 401, a fully connected layer 402, a fully connected layer 403, and an output layer 404. A key part quality standard value set 400 is inputted into the transcoding parameter prediction model 4000. Through the fully connected layer 402 and the fully connected layer 403 in the transcoding parameter prediction model 4000, convolution calculation may be performed on the feature 400*a*, the feature 400*b*, . . . , and the feature 400*n* and the background prediction transcoding parameter 400*m*. That is, the feature 400*a*, the feature 400*b*, . . . , and the feature 400*n* and the background prediction transcoding parameter 400*m* are fused, to generate the initial transcoding parameter prediction value corresponding to the each key part quality standard value in the key part quality standard value set 400. Through the output layer 404 of the transcoding parameter prediction model, an initial transcoding parameter prediction value of 1, an initial transcoding parameter prediction value of 2, and an initial transcoding parameter prediction value of 3 can be outputted. The initial transcoding parameter prediction value of 1 corresponds to a key part quality standard value of 1, the initial transcoding parameter prediction value of 2 corresponds to a key part quality standard value of 2, and the initial transcoding parameter prediction value of 3 corresponds to a key part quality standard value of 3. It can be seen that, because each initial transcoding parameter prediction value outputted by the transcoding parameter prediction model 4000 corresponds to a key part quality standard value, the number of the initial transcoding parameter prediction values outputted by the transcoding parameter prediction model 4000 after performing feature fusion depends on the number of key part quality standard values in the key part quality standard value set.

A background prediction transcoding parameter corresponds to the overall quality (the frame-level image quality) of a video. The purpose of inputting the background prediction transcoding parameter into the transcoding parameter prediction model together with the background features and the key part region features is to use the background prediction transcoding parameter as a premise, to obtain a key part prediction transcoding parameter required for achieving the expected quality of the key part in the key part region on the basis that the overall quality of the video is the quality corresponding to the background prediction transcoding parameter.

Subsequently, the expected quality of the key part is acquired, and the expected quality of the key part is matched with the key part quality standard value set. When there is a key part quality standard value that is the same as the expected quality of the key part in the key part quality standard value set, an initial transcoding parameter prediction value corresponding to the key part quality standard value that is the same as the expected quality of the key part in the initial transcoding parameter prediction values may be determined as the target transcoding parameter prediction value according to the mapping relationship between the initial transcoding parameter prediction values and the key part quality standard values (i.e., a one-to-one correspondence between the initial transcoding parameter prediction values and the key part quality standard values).

For example, the initial transcoding parameter prediction values of 20, 30, and 40 are outputted by the transcoding parameter prediction model. The initial transcoding parameter prediction value of 20 corresponds to a key part quality standard value of 86, the initial transcoding parameter prediction value of 30 corresponds to a key part quality standard value of 89, and the initial transcoding parameter prediction value of 40 corresponds to a key part quality standard value of 92. An expected quality of 89 of a key part is obtained, and then a matching result after matching the expected quality of 89 of the key part with the key part quality standard value set of {86, 89, 92} is that the key part quality standard value of 89 is the same as the expected quality of 89 of the key part. Because an initial transcoding parameter prediction value of 30 corresponds to the key part quality standard value of 89, the initial transcoding parameter prediction value of 30 is used as the target transcoding parameter prediction value.

When there is no key part quality standard value that is the same as the expected quality of the key part in the key part quality standard value set, a linear function may be determined according to the mapping relationship between the initial transcoding parameter prediction values and the key part quality standard values, and the target transcoding parameter prediction value is determined according to the linear function and the expected quality of the key part. A specific implementation of determining the linear function according to the mapping relationship between the initial transcoding parameter prediction values and the key part quality standard values may be as follows: acquiring key part quality standard values greater than the expected quality of the key part in the key part quality standard value set, and determining a minimum key part quality standard value in the key part quality standard values greater than the expected quality of the key part; and acquiring key part quality standard values less than the expected quality of the key part in the key part quality standard value set, and determining a maximum key part quality standard value in the key part quality standard values less than the expected quality of the key part. That is to say, the minimum key part quality standard value and the maximum key part quality standard value are two values, large and small, which are closest to the expected quality of the key part in the key part quality standard value set. According to the mapping relationship between the initial transcoding parameter prediction values and the key part quality standard values, an initial transcoding parameter prediction value corresponding to the maximum key part quality standard value, and an initial transcoding parameter prediction value corresponding to the minimum key part quality standard value are determined. According to the maximum key part quality standard value, the initial transcoding parameter prediction value corresponding to the maximum key part quality standard value, the minimum key part quality standard value, and the initial transcoding parameter prediction value corresponding to the minimum key part quality standard value, the linear function is determined. A specific method for determining the target transcoding parameter prediction value according to the linear function can be shown in formula (1):

$$ROI_{QPoffset_{target}} = ROI_{QPoffset_{min}} + \frac{ROI_{QPoffset_{max}} - ROI_{QPoffset_{min}}}{ROI_{VMAF_{max}} - ROI_{VMAF_{min}}} * \left(ROI_{VMAF_{target}} - \mathrm{ROI\_VMAF}_{min}\right) \tag{1}$$

where $\mathrm{ROI}_{QPoffset_{target}}$ is the target transcoding parameter prediction value corresponding to the expected quality of the key part $\mathrm{ROI}_{VMAF_{target}}$; $\mathrm{ROI}_{VMAF_{max}}$ is the minimum key part quality standard value in the key part quality standard values greater than the expected quality of the key part; $\mathrm{ROI}_{VMAF_{min}}$ is the maximum key part quality standard value in the key part quality standard values less than the expected quality of the key part; $\mathrm{ROI}_{QPoffset_{max}}$ is the initial transcoding parameter prediction value corresponding to the minimum key part quality standard value in the key part quality standard values greater than the expected quality of the key part; and $\mathrm{ROI}_{QPoffset_{min}}$ is the initial transcoding parameter prediction value corresponding to the maximum key part quality standard value in the key part quality standard values less than the expected quality of the key part.

For example, the initial transcoding parameter prediction values of 20, 30, 40 and 50 are outputted by the transcoding parameter prediction model. The initial transcoding parameter prediction value of 20 corresponds to a key part quality standard value of 85, the initial transcoding parameter prediction value of 30 corresponds to a key part quality standard value of 86, the initial transcoding parameter prediction value of 40 corresponds to a key part quality standard value of 89, and the initial transcoding parameter prediction value of 50 corresponds to a key part quality standard value of 92. The expected quality of 88 of the key part is obtained, that is, $ROI_{VMAF_{target}}$ in the above formula (1) is 88, and then, a matching result after matching the expected quality of 88 of the key part with the key part quality standard value set of {85, 86, 89, 92} is that there is no value in the key part quality standard value set that is the same as the expected quality of 88 of the key part. Therefore, the key part quality standard values greater than the expected quality of 88 of the key part in the key part quality standard value set of {85, 86, 89, 92} are obtained as 89 and 92. Because 89 is less than 92, the key part quality standard value of 89 may be determined as the minimum key part quality standard value in the key part quality standard values greater than the expected quality of 88 of the key part, that is, $ROI_{VMAF_{max}}$ in the above formula (1) is 89. The key part quality standard values less than the expected quality of 88 of the key part in the key part quality standard value set of {85, 86, 89, 92} are obtained as 85 and 86. Because 86 is greater than 85, the key part quality standard value of 86 may be determined as the maximum key part quality standard value in the key part quality standard values less than the expected quality of 88 of the key part, that is, $ROI_{VMAF_{min}}$ in the above formula (1) is 86. It can be seen that, in the key part quality standard value set of {85, 86, 89, 92}, the key part quality standard value of 86 and the key part quality standard value of 89 are two values, small and large, which are closest to the expected quality of 88 of the key part. An initial transcoding parameter prediction value corresponding to the key part quality standard value of 86 is obtained as 30, that is, $ROI_{QPoffset_{min}}$ in the above formula (1) is 30. An initial transcoding parameter prediction value corresponding to the key part quality standard value of 89 is obtained as 40, that is, $ROI_{QPoffset_{max}}$ in the above formula (1) is 40. Then, according to the above formula (1), a target transcoding parameter prediction value $$ROI_{QPoffset_{target}} = 30 + \frac{40-30}{89-86} \times (88-86)$$

corresponding to the expected quality of 88 of the key part can be obtained, that is, $ROI_{QPoffset_{target}}$=36.7.

In some embodiments, it is to be understood that, when the expected quality of the key part is not in the range corresponding to the key part quality standard value set, if the expected quality of the key part is greater than the maximum key part quality standard value in the key part quality standard value set, then a maximum key part quality standard value and a second maximum key part quality standard value are obtained in the key part quality standard value set. According to the maximum key part quality standard value, an initial transcoding parameter prediction value corresponding to the maximum key part quality standard value, the second maximum key part quality standard value, and an initial transcoding parameter prediction value corresponding to the second maximum key part quality standard value, a linear function is determined. Then, according to the linear function, a target transcoding parameter prediction value is determined. That is, $ROI_{VMAF_{max}}$ in the above formula (1) is the maximum key part quality standard value, $ROI_{VMAF_{min}}$ in the above formula (1) is the second maximum key part quality standard value, $ROI_{QPoffset_{max}}$ in the above formula (1) is the initial transcoding parameter prediction value corresponding to the maximum key part quality standard value, and $ROI_{QPoffset_{min}}$ in the above formula (1) is the initial transcoding parameter prediction value corresponding to the second maximum key part quality standard value. If the expected quality of the key part is less than the minimum key part quality standard value in the key part quality standard value set, then a minimum key part quality standard value and a second minimum key part quality standard value are obtained in the key part quality standard value set. According to the minimum key part quality standard value, an initial transcoding parameter prediction value corresponding to the minimum key part quality standard value, the second minimum key part quality standard value, and an initial transcoding parameter prediction value corresponding to the second minimum key part quality standard value, a linear function is determined. Then, according to the linear function, a target transcoding parameter prediction value is determined. That is, $ROI_{VMAF_{max}}$ in the above formula (1) is the second minimum key part quality standard value, $ROI_{VMAF_{min}}$ in the above formula (1) is the minimum key part quality standard value, $ROI_{QPoffset_{max}}$ in the above formula (1) is the initial transcoding parameter prediction value corresponding to the second minimum key part quality standard value, and $ROI_{QPoffset_{min}}$ in the above formula (1) is the initial transcoding parameter prediction value corresponding to the minimum key part quality standard value. For example, the initial transcoding parameter prediction values of 20, 30, 40 and 50 are outputted by the transcoding parameter prediction model. The initial transcoding parameter prediction value of 20 corresponds to a key part quality standard value of 85, the initial transcoding parameter prediction value of 30 corresponds to a key part quality standard value of 86, the initial transcoding parameter prediction value of 40 corresponds to a key part quality standard value of 89, and the initial transcoding parameter prediction value of 50 corresponds to a key part quality standard value of 92. Therefore, it can be seen that, the key part quality standard value set is {85, 86, 89, 92}. The expected quality of 94 of the key part is obtained, that is, $ROI_{VMAF_{target}}$ in the above formula (1) is 94, and then, a matching result after matching the expected quality of 94 of the key part with the key part quality standard value set of {85, 86, 89, 92} is that there is no value in the key part quality standard value set of {85, 86, 89, 92} that is the same as the expected quality of 94 of the key part, and the expected quality of 94 of the key part is greater than the maximum key part quality standard value of 92 in the key part quality standard value set of {85, 86, 89, 92}. Then, a maximum key part quality standard value of 92, and a second maximum key part quality standard value of 89 in the key part quality standard value set of {85, 86, 89, 92} can be obtained. 89 may be substituted into $ROI_{VMAF_{min}}$ in the above formula (1), and 92 may be substituted into $ROI_{VMAF_{max}}$ in the above formula (1). Because an initial transcoding parameter prediction value of 40 corresponds to the key part quality standard value of 89, and an initial transcoding parameter prediction value of 50 corresponds to the key part quality standard value of 92, 40 can be substituted into $ROI_{QPoffset_{min}}$ in the above formula (1), and 50 can be substituted into $ROI_{QPoffset_{max}}$ in the above formula (1). Then, according to the above formula (1), a target transcoding parameter prediction value $$ROI_{QPoffset_{target}} = 40 + \frac{50-40}{92-89} \times (94-89)$$

corresponding to the expected quality of 94 of the key part can be obtained, that is, $ROI_{QPoffset_{target}}$=56.7.

In step S105, the target video is transcoded according to the target transcoding parameter prediction value.

In this embodiment of this disclosure, the target video is transcoded according to the target transcoding parameter prediction value, so that the image quality of the key part region in the transcoded target video is consistent with the foregoing expected quality of the key part. In addition, the overall image quality of the transcoded target video is consistent with the expected quality of the background corresponding to the foregoing background prediction transcoding parameter.

In the embodiments of this disclosure, by acquiring background features, key part region features, a background prediction transcoding parameter, and an expected quality of a key part of a target video, a target transcoding parameter prediction value satisfying an expected quality of a background and matched with the expected quality of the key part can be obtained according to the background features, key part region features, and background prediction transcoding parameter of the target video. Because region-level features of the key part are newly added to take specific details of the key part region in the target video into consideration, a predicted target transcoding parameter prediction value can be more adapted to the key part region on the basis of satisfying the expected quality of the background. Therefore, by transcoding the target video according to the target transcoding parameter prediction value, the quality of the key part region of the transcoded target video can satisfy the expected quality of the key part, that is, the quality of the key part region after the video transcoding can be improved.

Figure 5:
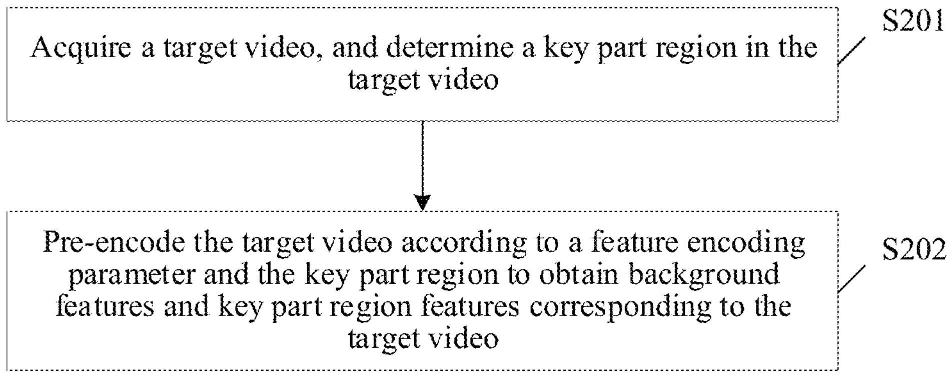
FIG. 5 is an exemplary flowchart of acquiring video features of a target video according to an embodiment of this disclosure.

Further, refer to FIG. 5, which is an exemplary flowchart of acquiring video features of a target video according to an embodiment of this disclosure. As shown in FIG. 5, the process may include the following steps.

In step S201, a target video is acquired, and a key part region in the target video is acquired.

In this embodiment of this disclosure, the target video may be a short video or a video clip within a specified duration threshold. The duration threshold may be an manually specified value, such as 20 s, 25 s, or the like. When the duration of an obtained initial original video is excessively long, that is, greater than the duration threshold, the initial video may be segmented. A specific method of segmenting the initial video may be as follows: the initial video is inputted into a segmentation encoder, a scene switch frame of the initial video is determined in the segmentation encoder, the initial video is segmented into at least two different video clips according to the scene switch frame, and a target video clip is acquired in the at least two different video clips and used as the target video. The scene switch frame may refer to video frames of different scenes. For example, if scenes in two adjacent video frames are different, the two video frames of different scenes may be determined as scene switch frames. The scene in the video frame may include a scene with simple or complex texture, violent or gentle movement, or the like, and the scene may include a building, an environment, an action of a character, or the like. For example, a video frame a and a video frame b are adjacent video frames, the video frame a shows a stadium scene of a basketball player dunking, and the video frame b shows an auditorium scene of the audience shouting. Because the scene of the video frame a is different from the scene of the video frame b, both the video frame a and the video frame b can be used as scene switch frames, and video segmentation is performed between the video frame a and the video frame b.

In step S202, the target video is pre-encoded according to a feature encoding parameter and the key part region to obtain background features and key part region features corresponding to the target video.

In this embodiment of this disclosure, the feature encoding parameter may refer to a configuration parameter in a feature encoder, and may be an manually specified value. According to the feature encoding parameter, the target video can be pre-encoded to obtain the background features of the target video. The background features are overall features obtained based on the overall content of the video. In the video frames of the target video, a video frame including a key part (e.g., a face, a hand, a foot, or the like) is determined as a key video frame. The key video frame and the key part region are pre-encoded according to the feature encoding parameter, so that the key part region features of the target video can be obtained. The key part region features are region features obtained based on the key part region. A specific method for obtaining the key part region features according to the feature encoding parameter may be as follows: the key video frame is pre-encoded according to the feature encoding parameter to obtain a basic attribute of the key video frame, where the basic attribute may be an attribute such as a PSNR, an SSIM, and VMAF of the key part region of the key video frame, and the basic attribute may be used for representing the image quality of the key part region in the key video frame; the total number of the video frames of the target video and the total number of the key video frames are obtained, and according to the total number of the video frames of the target video and the total number of the key video frames, a key part frame number ratio can be determined; the area of the key part region in a key video frame and the total area of the key video frame are obtained, and a key part area ratio of the area of the key part region to the total area of the key video frame can be determined; and subsequently, the basic attribute of the key video frames, the key part frame number ratio, and the key part area ratio may all be determined as the key part region features.

For an exemplary implementation of obtaining the background features and the key part region features of the target video, reference may be made to the description of obtaining the background features and the key part region features of the target video in step S101 in the embodiment corresponding to FIG. 3. Details are not repeated herein again.

In this embodiment of this disclosure, by acquiring background features, key part region features, a background prediction transcoding parameter, and an expected quality of a key part of a target video, a target transcoding parameter prediction value matched with the expected quality of the key part can be obtained according to the background features, key part region features, and background prediction transcoding parameter of the target video. Because region-level features of the key part are newly added to take specific details of the key part region in the target video into consideration, a predicted target transcoding parameter prediction value can be more adapted to the key part region. Therefore, by transcoding the target video according to the target transcoding parameter prediction value, the quality of the key part region of the transcoded target video can satisfy the expected quality of the key part. That is, the quality of the key part region after the video transcoding can be improved.

Figure 6:
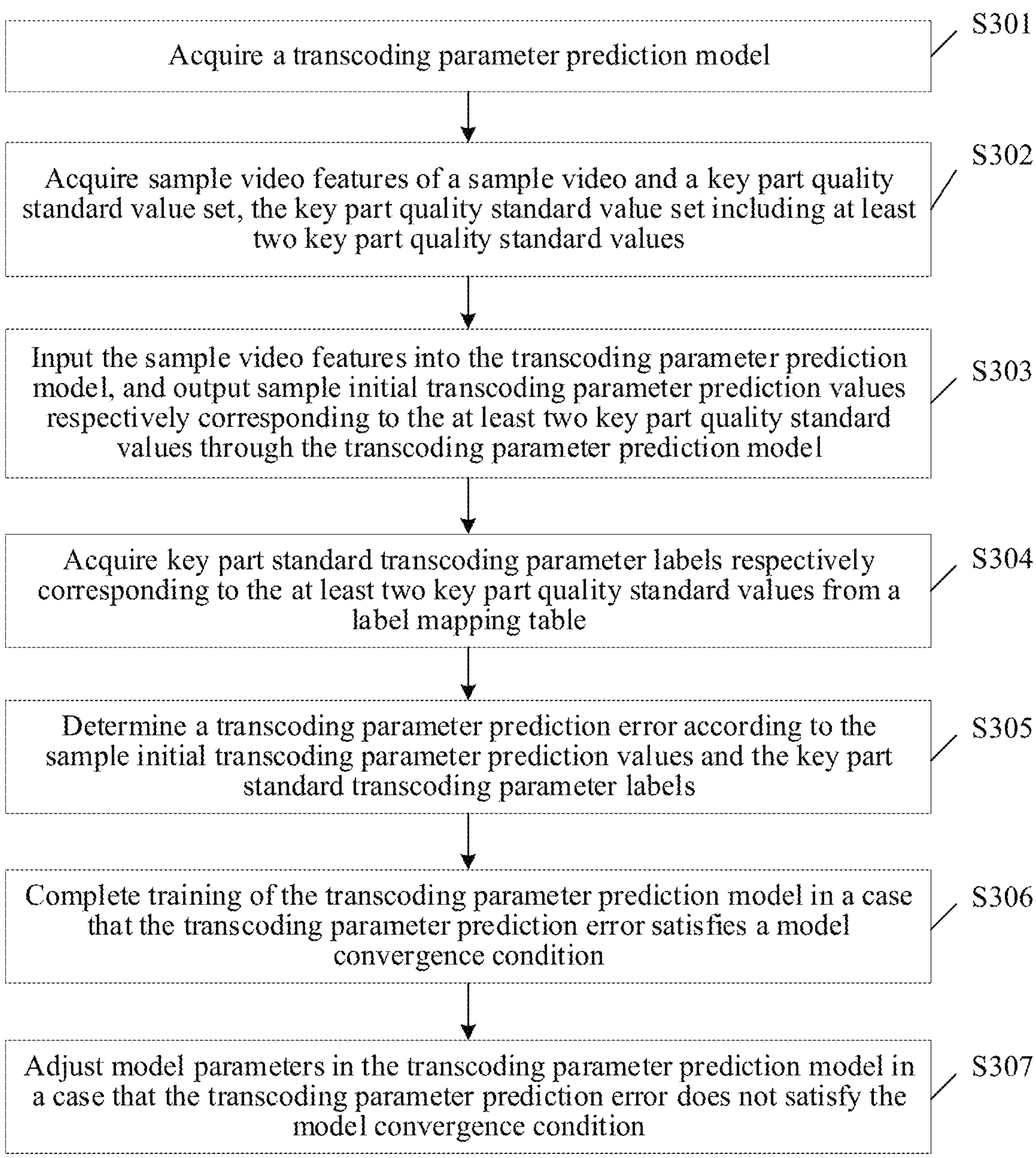
FIG. 6 is an exemplary flowchart of training a transcoding parameter prediction model according to an embodiment of this disclosure.

Further, refer to FIG. 6, which is an exemplary flowchart of training a transcoding parameter prediction model according to an embodiment of this disclosure. As shown in FIG. 6, the process may include the following steps.

In step S301, a to-be-trained transcoding parameter prediction model is acquired.

In this disclosure, the transcoding parameter prediction model may include an input layer, two fully connected layers, and an output layer. The structure of the transcoding parameter prediction model may be as shown in the transcoding parameter prediction model 4000 in the embodiment corresponding to FIG. 4. The input layer is configured to receive data inputted into the transcoding parameter prediction model, and both of the two fully connected layers have model parameters. The fully connected layers may perform convolution calculation on the data inputted into the transcoding parameter prediction model through the model parameters. The output layer may output a result obtained after the convolution calculation of the fully connected layers.

The model parameters of the fully connected layers of the untrained transcoding parameter prediction model may be randomly generated values, which are used as initial parameters of the model parameters.

In step S302, sample video features of a sample video and a key part quality standard value set are acquired, the key part quality standard value set including at least two key part quality standard values.

In this embodiment of this disclosure, the sample video may refer to a large number of video clips within a duration threshold, and the large number of video clips may include content such as beauty makeup, food, sports, anchor shows, variety shows, or the like. The sample video features include sample background features and sample key part region features. For an exemplary implementation of acquiring the sample background features and the sample key part region features, reference may be made to the description of acquiring the background features and the key part region features of the target video in step S101 in the embodiment corresponding to FIG. 3. Details are not repeated herein again.

In step S303, the sample video features input into the transcoding parameter prediction model, and output sample initial transcoding parameter prediction values respectively corresponding to the at least two key part quality standard values through the transcoding parameter prediction model.

In this disclosure, the sample video features (i.e., the sample background features and the sample key part region features) are inputted into the transcoding parameter prediction model. Through initial model parameters of the fully connected layers in the transcoding parameter prediction model, the convolution calculation may be performed on the sample video features, so that at least two sample initial transcoding parameter prediction values of the sample video can be obtained, and each sample initial transcoding parameter prediction value corresponds to a key part quality standard value.

In step S304, key part standard transcoding parameter labels respectively corresponding to the at least two key part quality standard values are acquired from a label mapping table.

In this disclosure, the label mapping table may be used for training a transcoding parameter prediction model, the label mapping table is constructed by using a label encoder, and the label mapping table may be used for representing a correspondence between key part qualities and key part transcoding parameters. The label mapping table is the standard for training the transcoding parameter prediction model. The label mapping table may include a key part standard transcoding parameter label corresponding to each key part quality standard value in the key part quality standard value set. The significance of training the transcoding parameter prediction model is to make errors between the initial transcoding parameter prediction values outputted from the transcoding parameter prediction model and the key part standard transcoding parameter labels in the label mapping table fall within an error range.

A specific method for constructing the label mapping table may be as follows: background test transcoding parameters and key part test transcoding parameters are acquired, the sample video features are inputted into a label encoder, and the sample video features can be encoded according to the background test transcoding parameters and the key part test transcoding parameters in the label encoder, to obtain key part test qualities corresponding to both the background test transcoding parameters and the key part test transcoding parameters. According to the mapping relationship between the key part test qualities and the key part test transcoding parameters, the label mapping table is constructed. If the key part test qualities do not include the key part quality standard values in the key part quality standard value set, a function may be constructed according to the key part test transcoding parameters and the key part test qualities. Then, according to the function, key part standard transcoding parameter labels corresponding to the key part quality standard values are determined.

Figure 7A:
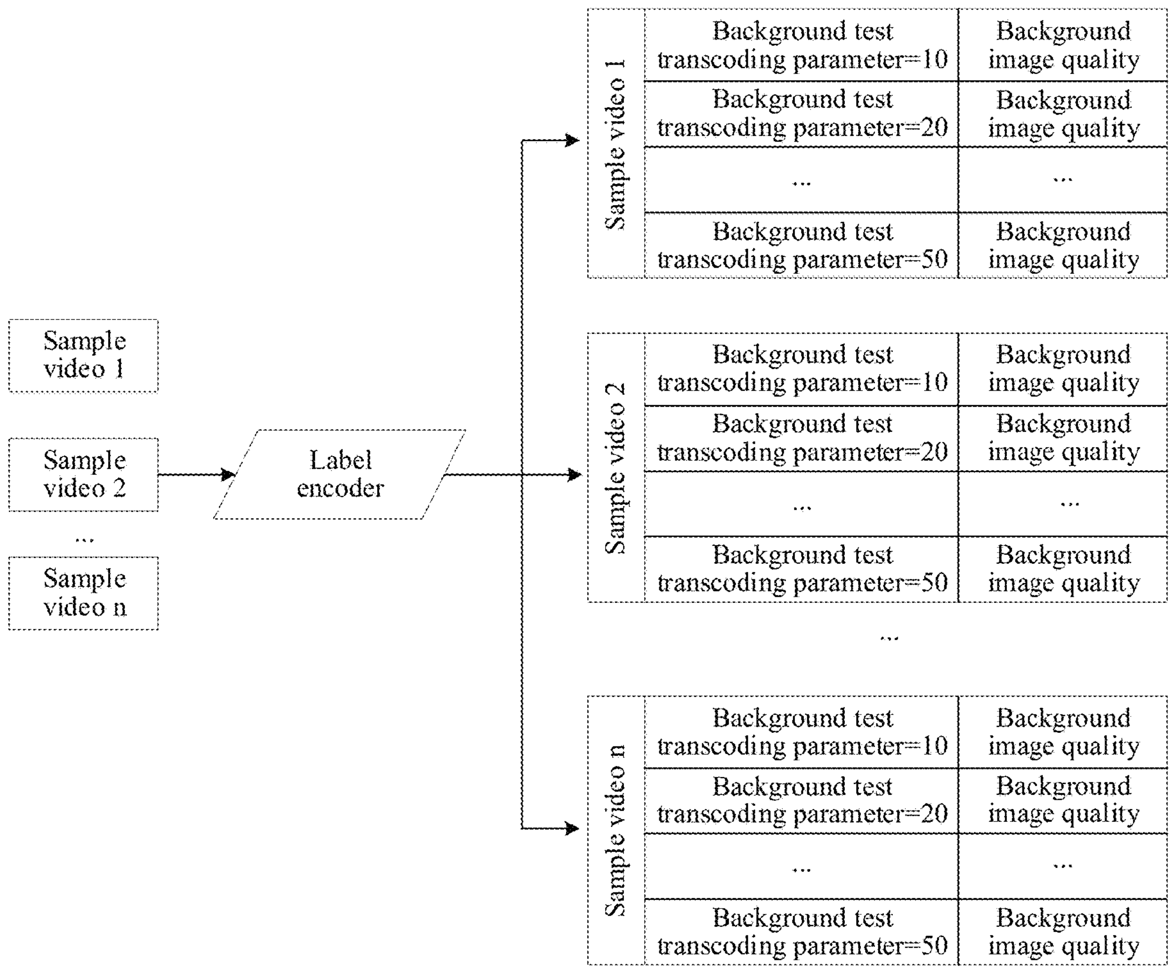
FIG. 7*a* is an exemplary diagram of obtaining background image qualities corresponding to background test transcoding parameters according to an embodiment of this disclosure.

For ease of understanding, further refer to FIG. 7*a*, which is an exemplary diagram of obtaining background image qualities corresponding to background test transcoding parameters according to an embodiment of this disclosure. As shown in FIG. 7*a*, sample videos include a sample video 1, a sample video 2, . . . , and a sample video n. Taking the sample video 1 as an example, sample video features of the sample video 1 are inputted into a label encoder. In the label encoder, the sample video features are encoded by using the background test transcoding parameters, so that background image qualities of the sample video 1 under different background test transcoding parameters can be obtained. As shown in FIG. 7*a*, the background test transcoding parameters may be integers from 10 to 50. Taking a background test transcoding parameter of 10 as an example, the sample video features of the sample video 1 are encoded by using the background test transcoding parameter, so that a background image quality corresponding to the background test transcoding parameter of 10 can be obtained. For an exemplary implementation of acquiring the sample video features of the sample video 1, reference may be made to the description of acquiring video features of a target video in step S101 in the embodiment corresponding to FIG. 3. Details are not repeated herein again. In the same way, background image qualities of the sample video 2, the sample video 3, . . . , and the sample video n under different background test transcoding parameters can be obtained.

Figure 7B:
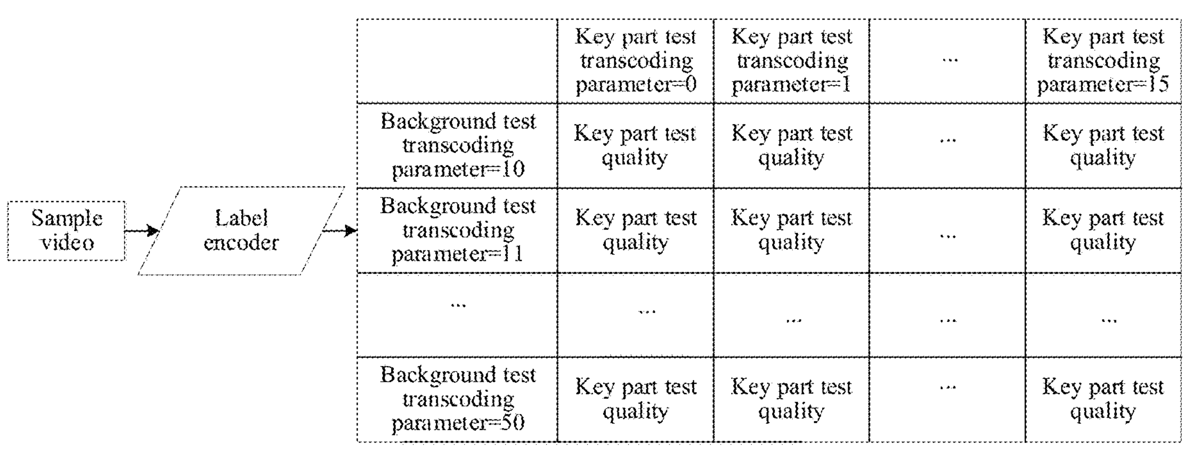
FIG. 7*b* is an exemplary diagram of constructing a label mapping table according to an embodiment of this disclosure.

Further, for ease of understanding, further refer to FIG. 7*b*, which is a schematic diagram of constructing a label mapping table according to an embodiment of this disclosure. In the embodiment corresponding to FIG. 7*a*, a background image quality (i.e., a frame-level image quality) corresponding to each background test transcoding parameter has been obtained. To obtain a key part region transcoding parameter required by the key part region in the video to reach a specified quality of the key part when the background transcoding parameter is the background test transcoding parameter, in this disclosure, different key part test transcoding parameters under each background test transcoding parameter may be inputted, and the background test transcoding parameters are encoded together with the key part transcoding parameters, to obtain the key part test qualities corresponding to both the background test transcoding parameters and the key part test transcoding parameters. As shown in FIG. 7*b*, the key part test transcoding parameters may be a total of 16 consecutive integer values from 0 to 15, and each background test transcoding parameter is encoded 16 times (a total of 16 transcoding parameter test values including a key part test transcoding parameter 0, a key part test transcoding parameter 1, . . . , and a key part test transcoding parameter 15), to obtain the key part test qualities corresponding to both the key part test transcoding parameters and the background test transcoding parameters. As shown in FIG. 7*b*, taking a background test transcoding parameter of 10 as an example, when the background transcoding parameter is the background test transcoding parameter of 10, a key part test transcoding parameter of 0 is inputted, and then the sample video is encoded, so that the key part test qualities corresponding to both the background test transcoding parameter of 10 and the key part test transcoding parameter of 0 can be obtained. In the same way, after encoding each background test transcoding parameter (background test transcoding parameters 10 to 50) 16 times, the key part test transcoding parameters corresponding to different key part test qualities under each background test transcoding parameter can be obtained, and therefore the label mapping table can be obtained. As shown in FIG. 7*b*, the label mapping table includes a one-to-one correspondence between the key part test transcoding parameters and the key part test qualities. Subsequently, the key part test qualities in the label mapping table may be matched with the key part quality standard values, If the key part test qualities in the label mapping table include the key part quality standard values, then the key part test transcoding parameters corresponding to the key part quality standard values may be determined in the label mapping table as the key part standard transcoding parameter labels, and used for training the transcoding parameter prediction model, so that the initial transcoding parameter prediction values corresponding to the key part quality standard values outputted by the transcoding parameter prediction model continuously approach the key part standard transcoding parameter labels. If the key part test qualities in the label mapping table do not include the key part quality standard values, a function may be constructed according to the key part test qualities and key part test transcoding parameters in the label mapping table. According to the function, the key part transcoding parameters corresponding to the key part quality standard values may be determined and used as the key part standard transcoding parameter labels for training the transcoding parameter prediction model.

For example, taking a label mapping table being Table 1 as an example, as shown in Table 1, the row data in the label mapping table is used for representing the key part test transcoding parameters, the column data is used for representing the background test transcoding parameters, and one background test transcoding parameter and one key part test transcoding parameter together correspond to one key part test quality. For example, a background test transcoding parameter of 10 and a key part test transcoding parameter of 0 together correspond to a key part test quality of 56. Through the label mapping table shown as Table 1, key part test transcoding parameters corresponding to different key part test qualities may be obtained. The key part test qualities may be used as key part quality labels, and the key part test transcoding parameters corresponding to the key part quality labels are used as key part transcoding parameter labels. The key part quality standard value set of {84, 88, 92, 98} is obtained. Because there is no value that is the same as a key part quality standard value of 98 in the key part test qualities of the label mapping table, a function y=2x+88 is constructed according to a key part test transcoding parameter of 3, a key part test transcoding parameter of 4, a key part test quality of 94 and a key part test quality of 96, where y may be used for representing the key part test qualities, x may be used for representing the key part test transcoding parameters, and the function y=2x+88 may be used for representing the relationship between the key part test transcoding parameters and the key part test qualities. Then, the key part quality standard value of 98 is substituted into the function y=2x+88 (that is, y=98), and a key part standard transcoding parameter label of 5 corresponding to the key part quality standard value of 98 can be obtained. The key part standard transcoding parameter label of 5 and the key part quality standard value of 98 may be inserted into the label mapping table. That is, the label mapping table is updated, to obtain a label mapping table including all the key part quality standard values, and an updated label mapping table may be shown as Table 2.

TABLE 1

| | 0 | 1 | 2 | 3 | 4 |
|---|---|---|---|---|---|
| 10 | 56 | 57 | 59 | 60 | 62 |
| 11 | 64 | 66 | 67 | 68 | 69 |
| 12 | 70 | 72 | 74 | 75 | 77 |
| 13 | 79 | 80 | 82 | 84 | 87 |
| 14 | 88 | 90 | 92 | 94 | 96 |

TABLE 2

| | 0 | 1 | 2 | 3 | 4 | 5 |
|---|---|---|---|---|---|---|
| 10 | 56 | 57 | 59 | 60 | 62 | 98 |
| 11 | 64 | 66 | 67 | 68 | 69 | 98 |
| 12 | 70 | 72 | 74 | 75 | 77 | 98 |
| 13 | 79 | 80 | 82 | 84 | 87 | 98 |
| 14 | 88 | 90 | 92 | 94 | 96 | 98 |

Through the label mapping table shown as Table 2, a key part transcoding parameter label of 3 corresponding to a key part quality standard value of 84, a key part transcoding parameter label of 0 corresponding to a key part quality standard value of 88, a key part transcoding parameter label of 2 corresponding to a key part quality standard value of 92, and a key part transcoding parameter label of 5 corresponding to a key part quality standard value of 98 can be obtained. Then, the key part transcoding parameter label of 3, the key part transcoding parameter label of 0, the key part transcoding parameter label of 2, and the key part transcoding parameter label of 5 can all be used as the key part standard transcoding parameter labels.

The data in Table 1 or Table 2 is not representative, and is only a reference example made for ease of understanding.

The above method for determining the key part transcoding parameters corresponding to the key part quality standard values includes but is not limited to constructing a function, and the method for constructing a function includes but is not limited to a manner of constructing a function according to the key part test transcoding parameters and the key part test qualities. Alternatively, the function may be constructed by combining the background test transcoding parameters, the key part test transcoding parameters, and the key part test qualities, and the function includes but is not limited to a linear function.

In step S305, a transcoding parameter prediction error is determined according to the sample initial transcoding parameter prediction values and the key part standard transcoding parameter labels.

In step S306, training of the transcoding parameter prediction model is completed when the transcoding parameter prediction error satisfies a model convergence condition.

In this embodiment of this disclosure, the model convergence condition may be a manually specified error range, for example, the error range is 0 to 0.5. When the transcoding parameter prediction error is within the error range, it can be determined that transcoding parameter prediction values outputted by the transcoding parameter prediction model are not much different from the key part standard transcoding parameter labels in the label mapping table, and then the transcoding parameter prediction model may no longer be trained.

In some embodiments, it is to be understood that, after the training of the transcoding parameter prediction model is completed, a trained transcoding parameter prediction model may be tested by using a video test set, and the video test set includes at least two test videos. A specific implementation of testing the transcoding parameter prediction model by using the video test set may be as follows: the test videos are inputted into the trained transcoding parameter prediction model, and the transcoding parameter prediction model may output the transcoding parameter prediction values; the key part quality standard values corresponding to the transcoding parameter prediction values are acquired, the key part standard transcoding parameter labels corresponding to the key part quality standard values are determined through the label mapping table, and errors between the transcoding parameter prediction values and the key part standard transcoding parameter labels are determined; if the errors are within the error range, the transcoding parameter prediction model can be put into subsequent use; and if the errors are not within the error range, it means that the values outputted by the trained transcoding parameter prediction model are still not accurate enough, and therefore, the transcoding parameter prediction model is further trained and then tested until the errors between the transcoding parameter prediction values outputted during testing and the corresponding key part standard transcoding parameter labels are within the error range.

In step S307, model parameters in the transcoding parameter prediction model are adjusted when the transcoding parameter prediction error does not satisfy the model convergence condition.

In this embodiment of this disclosure, if the transcoding parameter prediction error does not satisfy the model convergence condition, that is, the transcoding parameter prediction error is not within the error range, it means that the transcoding parameter prediction values outputted by the transcoding parameter prediction model are quite different from the key part standard transcoding parameter labels in the label mapping table, which indicates that the prediction values outputted by the transcoding parameter prediction model are not accurate. Therefore, the model parameters of the transcoding parameter prediction model may be adjusted according to the transcoding parameter prediction error, sample video features of the next sample video are further inputted, the adjusted model parameters are used for performing convolution calculation on the sample video features, to output transcoding parameter prediction values of a key part of the sample video and calculate a new transcoding parameter prediction error. If the new transcoding parameter prediction error satisfies the convergence condition, the training of the transcoding parameter prediction model is completed. If the new transcoding parameter prediction error does not satisfy the model convergence condition, the model parameters of the transcoding parameter prediction model are further adjusted according to the new transcoding parameter prediction error.

In the embodiments of this disclosure, by acquiring background features, key part region features, a background prediction transcoding parameter, and an expected quality of a key part of a target video, a target transcoding parameter prediction value satisfying an expected quality of a background and matched with the expected quality of the key part can be obtained according to the background features, key part region features, and background prediction transcoding parameter of the target video. Because region-level features of the key part are newly added to take specific details of the key part region in the target video into consideration, a predicted target transcoding parameter prediction value can be more adapted to the key part region on the basis of satisfying the expected quality of the background. Therefore, by transcoding the target video according to the target transcoding parameter prediction value, the quality of the key part region of the transcoded target video can satisfy the expected quality of the key part, that is, the quality of the key part region after the video transcoding can be improved.

Figure 8:
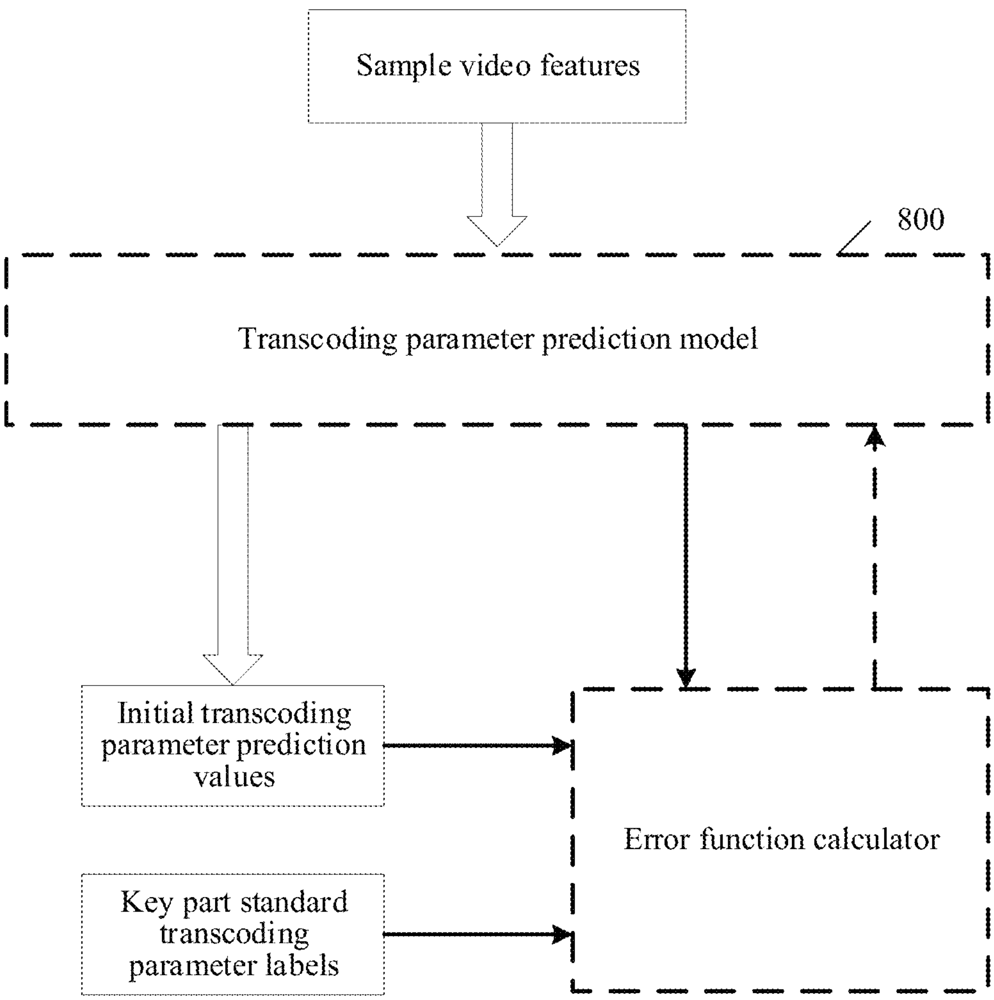
FIG. 8 is an exemplary diagram of a scenario of training a transcoding parameter prediction model according to an embodiment of this disclosure.

Refer to FIG. 8, which is an exemplary diagram of a scenario of training a transcoding parameter prediction model according to an embodiment of this disclosure. As shown in FIG. 8, sample video features are inputted into a transcoding parameter prediction model 800, and a fully connected layer in the transcoding parameter prediction model 800 may perform convolution calculation on the sample video features, so that initial transcoding parameter prediction values can be obtained and outputted. The initial transcoding parameter prediction values are in a one-to-one correspondence to key part quality standard values, and key part standard transcoding parameter labels corresponding to the key part quality standard values may be obtained according to a label mapping table. An error function calculator may calculate a transcoding parameter prediction error according to the initial transcoding parameter prediction values and the key part standard transcoding parameter labels. According to the transcoding parameter prediction error, model parameters of the transcoding parameter prediction model may be adjusted. After the parameters are adjusted, the above method is adopted to input new sample video features into the transcoding parameter prediction model 800 again, output initial transcoding parameter prediction values again, and calculate a transcoding parameter prediction error again. The process is repeated until the transcoding parameter prediction error satisfies the model convergence condition. In this case, the training of the transcoding parameter prediction model is completed, and the trained transcoding parameter prediction model may be used for predicting key part transcoding parameters subsequently.

Figure 9:
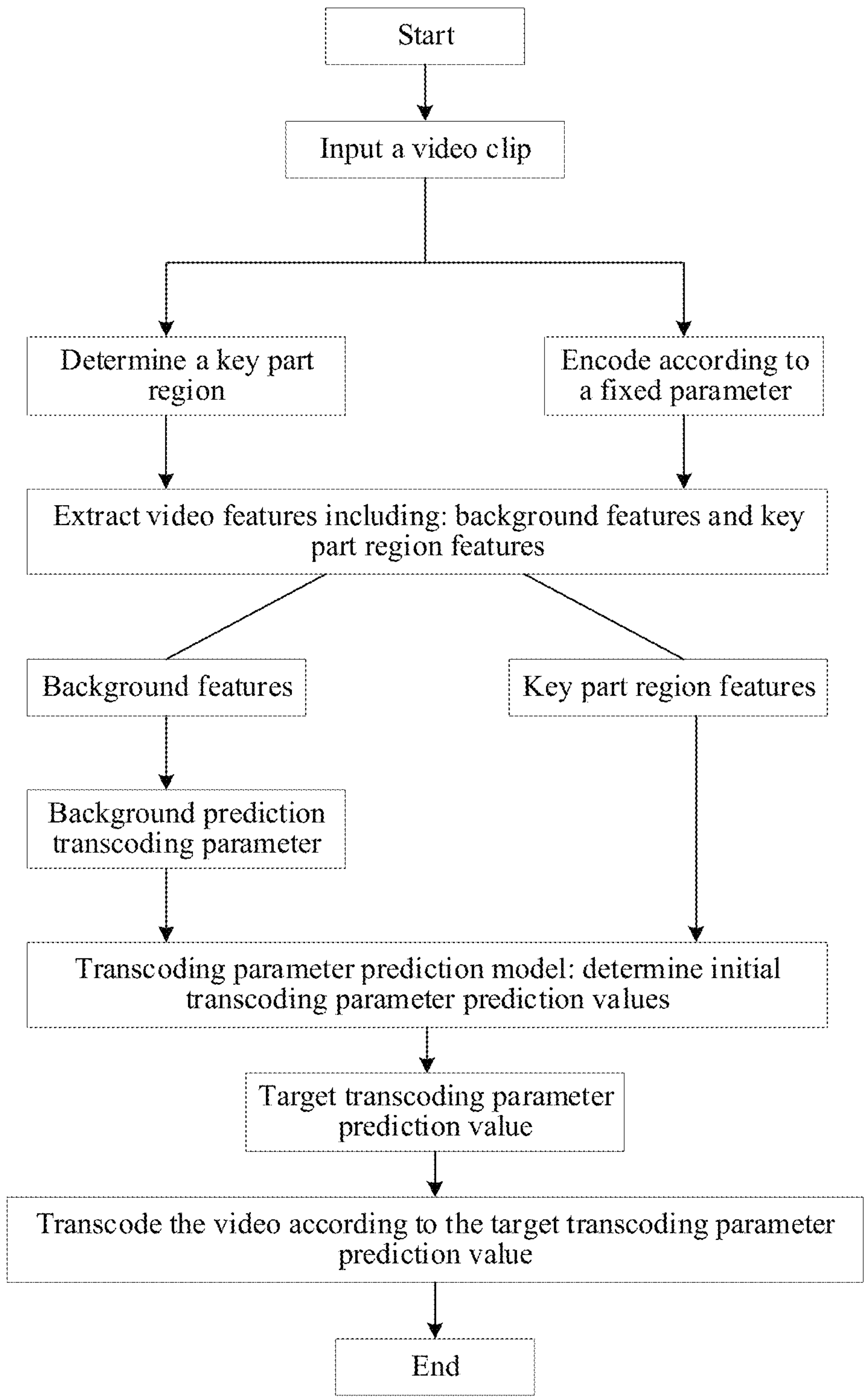
FIG. 9 is a diagram of an exemplary system architecture according to an embodiment of this disclosure.

Refer to FIG. 9, which is a diagram of an exemplary system architecture according to an embodiment of this disclosure. As shown in FIG. 9, the architecture of this disclosure includes first inputting a video clip into a feature encoder. The video clip may be a complete video, or may be a video clip obtained from a complete video. For an exemplary implementation of acquiring a video clip from a complete video, reference may be made to the description of acquiring the target video in step S201 in the embodiment corresponding to FIG. 5. Details are not repeated herein again. In the feature encoder, a key part region of the video clip may be determined, and then the video clip may be pre-encoded by using a fixed feature encoding parameter, so that video features of the video clip can be extracted. The video features may include background features and key part region features. For an exemplary implementation of obtaining the background features and the key part region features, reference may be made to the description of obtaining the background features and the key part region features in step S101 in the embodiment corresponding to FIG. 3. Details are not repeated herein again.

Further, according to the background features, the background prediction transcoding parameter can be obtained. The background features, the key part region features and the background prediction transcoding parameter are inputted into the transcoding parameter prediction model that has been trained and tested. A fully connected layer in the transcoding parameter prediction model may perform convolution calculation on the background features, the key part region features, and the background prediction transcoding parameter, so as to obtain the initial transcoding parameter prediction values corresponding to at least two key part quality standard values. The key part quality standard values are quality values inputted into the transcoding parameter prediction model before inputting the background features, the key part region features and the background prediction transcoding parameter into the transcoding parameter prediction model. The key part quality standard values are manually specified quality prediction values that are very close to the expected quality of the key part, and may or may not include the expected quality value of the key part. The expected quality value of the key part is the expected value of the image quality of the key part region in the video clip after the video clip is transcoded. For a specific implementation of the transcoding parameter prediction model determining the initial transcoding parameter prediction values corresponding to the key part quality standard values, reference may be made to the description of the transcoding parameter prediction model determining the initial transcoding parameter prediction values in step S103 in the embodiment corresponding to FIG. 3. Details are not repeated herein again. For an exemplary implementation of training the transcoding parameter prediction model, reference may be made to the description of training the transcoding parameter prediction model in the embodiment corresponding to FIG. 8. Details are not repeated herein again either.

Subsequently, after the transcoding parameter prediction model outputs the initial transcoding parameter prediction values, a key part quality standard value set corresponding to the key part quality standard values may be obtained. According to the key part quality standard value set, the initial transcoding parameter prediction values, and the expected quality of the key part, a target transcoding parameter prediction value matched with the expected quality of the key part can be determined. For a specific implementation of determining the target transcoding parameter prediction value according to the key part quality standard value set, the initial transcoding parameter prediction values, and the expected quality of the key part, reference may be made to the description of step S103 in the embodiment corresponding to FIG. 3. Details are not repeated herein again.

Further, after the target transcoding parameter prediction value is obtained, the video clip may be transcoded according to the target transcoding parameter prediction value. Because region-level features of the key part are newly added to take specific details of the key part region in the target video into consideration, on the basis of satisfying the expected quality of the background, the image quality of the key part region in the video clip can be controlled and adjusted to improve the image quality of the key part region in the transcoded video.

Figure 10:
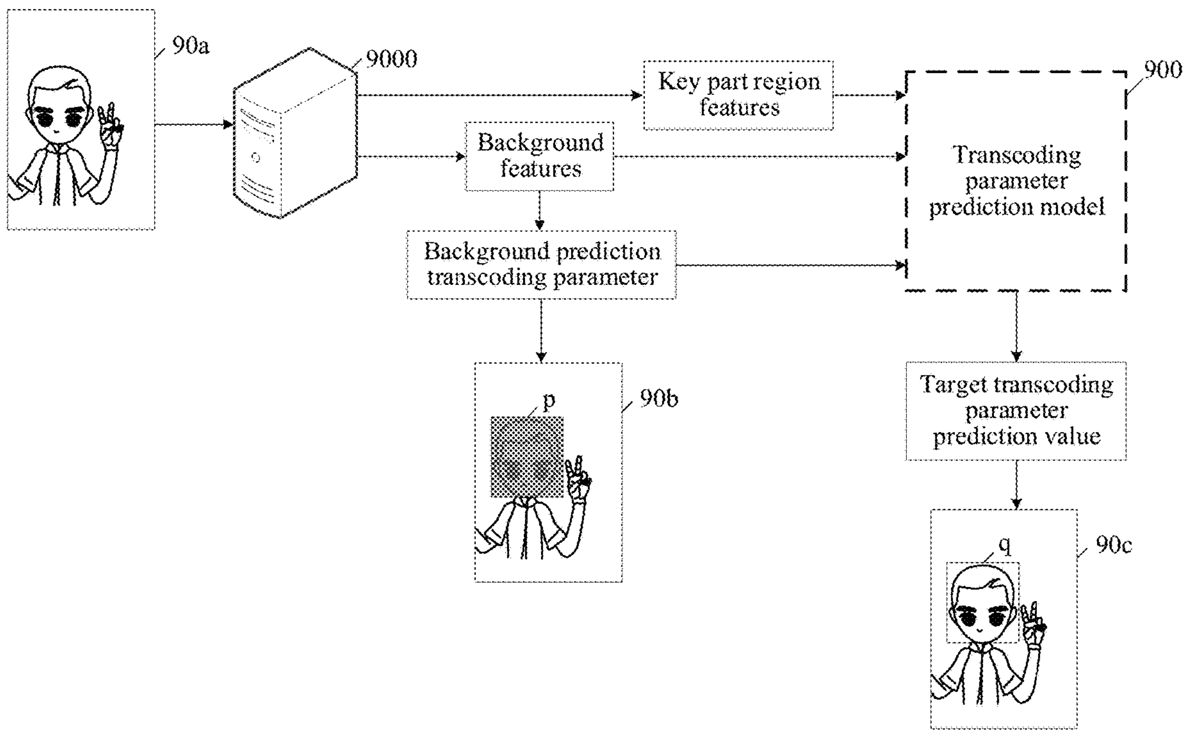
FIG. 10 is an exemplary schematic diagram of a scenario of transcoding a video based on a background prediction transcoding parameter and a target transcoding parameter prediction value according to an embodiment of this disclosure.

Refer to FIG. 10, which is a schematic diagram of a scenario of transcoding a video based on a target transcoding parameter prediction value according to an embodiment of this disclosure. In the scenario shown in FIG. 10, a key part is a face, and a key part region is a face region. As shown in FIG. 10, a service server 9000 obtains a video 90*a*, and the service server 9000 may obtain background features and key part region features (for example, face region features) of the video 90*a*. According to the background features, a background prediction transcoding parameter corresponding to an expected quality (a frame-level image quality) of a background can be obtained. According to the background prediction transcoding parameter, the video 90*a* is transcoded and a transcoded video 90*b* can be obtained. As shown in FIG. 10, because detailed features of a face region p in the video 90*a* are not put into consideration, the image quality of the face region p in the transcoded video 90*b* is not high and blurred. The key part region features, background features and background prediction transcoding parameter are inputted into a transcoding parameter prediction model 900 together. Through the transcoding parameter prediction model, a target transcoding parameter prediction value corresponding to the expected quality of the key part (e.g., an expected quality of a face) may be determined. Further, according to the target transcoding parameter prediction value, the video 90*a* is transcoded and a transcoded video 90*c* can be obtained. The image quality of the background in the video 90*c* is consistent with the image quality of the background in the video 90*b*, and the image quality of the face region p in the video 90*c* is consistent with the expected quality of the face. It can be seen that, because the detailed features in the face region p are put into consideration, the face region p in the transcoded video 90*c* has higher image quality and higher definition than the face region p in the video 90*b*.

To further illustrate the beneficial effects brought by this disclosure, an experimental comparison table is provided in the embodiments of this disclosure. As shown in Table 3, in this experiment, 56 video clips each of which has a duration of 20 s are used as a test data set. A key part is set as a face, and then a key part region is a face region. A bit rate is used as a transcoding parameter for testing. Data of attribute information such as a bit rate, VMAF, and SSIM shown in Table 3 of different video clips are counted, then average values of the data are obtained for the 56 video clips, and the average values are used as final experimental test data (that is, the video features). As can be seen from Table 3, when the overall quality remains unchanged, a face bit rate parameter (that is, the target transcoding parameter prediction value) matched with the expected quality of the face can be predicted for different expected qualities of the face. For example, when an overall quality is 88, a background bit rate parameter (for example, a background prediction bit rate) is 33.94. If an image quality of a face region is expected to be 92 after video transcoding (for example, an expected quality of a face is 90), then a face bit rate parameter of 3.88 matched with an expected quality of 92 of the face may be obtained according to the data such as a bit rate, VMAF, PSNR, face region quality, non-face region quality, face region bit rate and background bit rate parameter. If the image quality of the face region is expected to be 94 after the video transcoding, a face bit rate parameter of 5.41 matched with an expected quality of 94 of the face may be predicted.

In this experiment, it can be proved that, by taking the face region into consideration, features of the face region are extracted, the face bit rate corresponding to the expected quality of the face is predicted based on the features of the face region. Therefore, during video transcoding, if the image quality of the face region is expected to be a specific quality value, only a face bit rate option needs to be set as a face bit rate parameter corresponding to the quality value. In this way, the image quality of the face region in the video can be controlled, the image quality of the face region can be improved, and the image quality of the face region can be independently adjusted.

Additionally, not only the image quality of the face region can be improved, but also the bit rate can be saved. As shown in the experimental comparison table as Table 3, in the row of the overall quality of 94, a face region quality is 92.60, and a bit rate is 2372.67 kbps. After using this method, when an overall quality is 90 and a face region quality is 94.02 (which is consistent with the overall quality of 94), a bit rate is 1828 kbps, and the bit rate is saved by 22% compared with the bit rate of 2372.67 kbps when the overall quality is 94.

video, the expected quality of the key part being: an expected value of an image quality of the key part in a transcoded target video after transcoding the target video.

The transcoding parameter determining module 13 is configured to determine a background prediction transcoding parameter of the target video based on the background features, the background prediction transcoding parameter being matched with an expected quality of a background, and the expected quality of the background being: an expected value of an overall image quality of the transcoded target video after transcoding the target video.

The prediction value determining module 14 is configured to determine a target transcoding parameter prediction value satisfying the expected quality of the background and matched with the expected quality of the key part according to the background features, the key part region features and the background prediction transcoding parameter.

The video transcoding module 15 is configured to transcode the target video according to the target transcoding parameter prediction value.

For exemplary implementations of the feature acquisition module 11, the quality acquisition module 12, the transcoding parameter determining module 13, the prediction value determining module 14, and the video transcoding module 15, reference may be made to the description of step S101 to step S105 in the embodiment corresponding to FIG. 3. Details are not repeated herein again.

TABLE 3

Test set: 56 clips, 20 s

| Overall quality | Expected quality of a face | Bit rate (kbps) | VMAF | SSIM | PSNR | Face region quality | Non-face region quality | Face region bit rate | Non-face region bit rate | Background bit rate parameter | Face bit rate parameter | Bit rate increase: ROI region | Bit rate increase: Overall |
|---|---|---|---|---|---|---|---|---|---|---|---|---|---|
| 88 | — | 1610.68 | 89.07 | 0.97 | 39.56 | 84.61 | 89.13 | 34.71 | 1516.91 | 33.94 | 0.00 | | |
| | 92 | 1639.02 | 89.33 | 0.97 | 39.65 | 91.85 | 89.17 | 56.09 | 1523.39 | 33.94 | 3.88 | 61.61% | 1.76% |
| | 94 | 1655.11 | 89.40 | 0.97 | 39.67 | 93.82 | 89.18 | 68.42 | 1526.87 | 33.94 | 5.41 | 97.15% | 2.76% |
| 90 | — | 1791.51 | 90.81 | 0.97 | 40.07 | 87.25 | 90.85 | 38.93 | 1690.97 | 32.94 | 0.00 | | |
| | 94 | 1828.27 | 91.05 | 0.97 | 40.15 | 94.02 | 90.88 | 66.72 | 1699.13 | 32.94 | 4.19 | 71.37% | 2.05% |
| | 96 | 1855.03 | 91.13 | 0.97 | 40.18 | 96.01 | 90.89 | 87.40 | 1705.01 | 32.94 | 6.22 | 124.29% | 3.55% |
| 94 | — | 2372.67 | 94.44 | 0.98 | 41.35 | 92.60 | 94.42 | 53.47 | 2250.75 | 30.27 | 0.00 | | 32.44% |
| 92 | — | 2034.14 | 92.62 | 0.97 | 40.66 | 89.97 | 92.63 | 44.87 | 1924.41 | 30.88 | 0.00 | | |
| | 94 | 2060.92 | 92.77 | 0.97 | 40.72 | 94.26 | 92.65 | 65.20 | 1930.46 | 30.88 | 2.78 | 37.45% | 1.32% |
| | 96 | 2086.40 | 92.85 | 0.97 | 40.72 | 96.14 | 92.66 | 84.68 | 1936.15 | 30.88 | 4.94 | 87.01% | 2.57% |

To sum up, through this experiment, it can be concluded that the beneficial effects brought by this disclosure include: some regions in video transcoding can be independently controlled and adjusted, the quality of the key part region after video transcoding can be improved, and the transcoding parameter can be saved.

Figure 11:
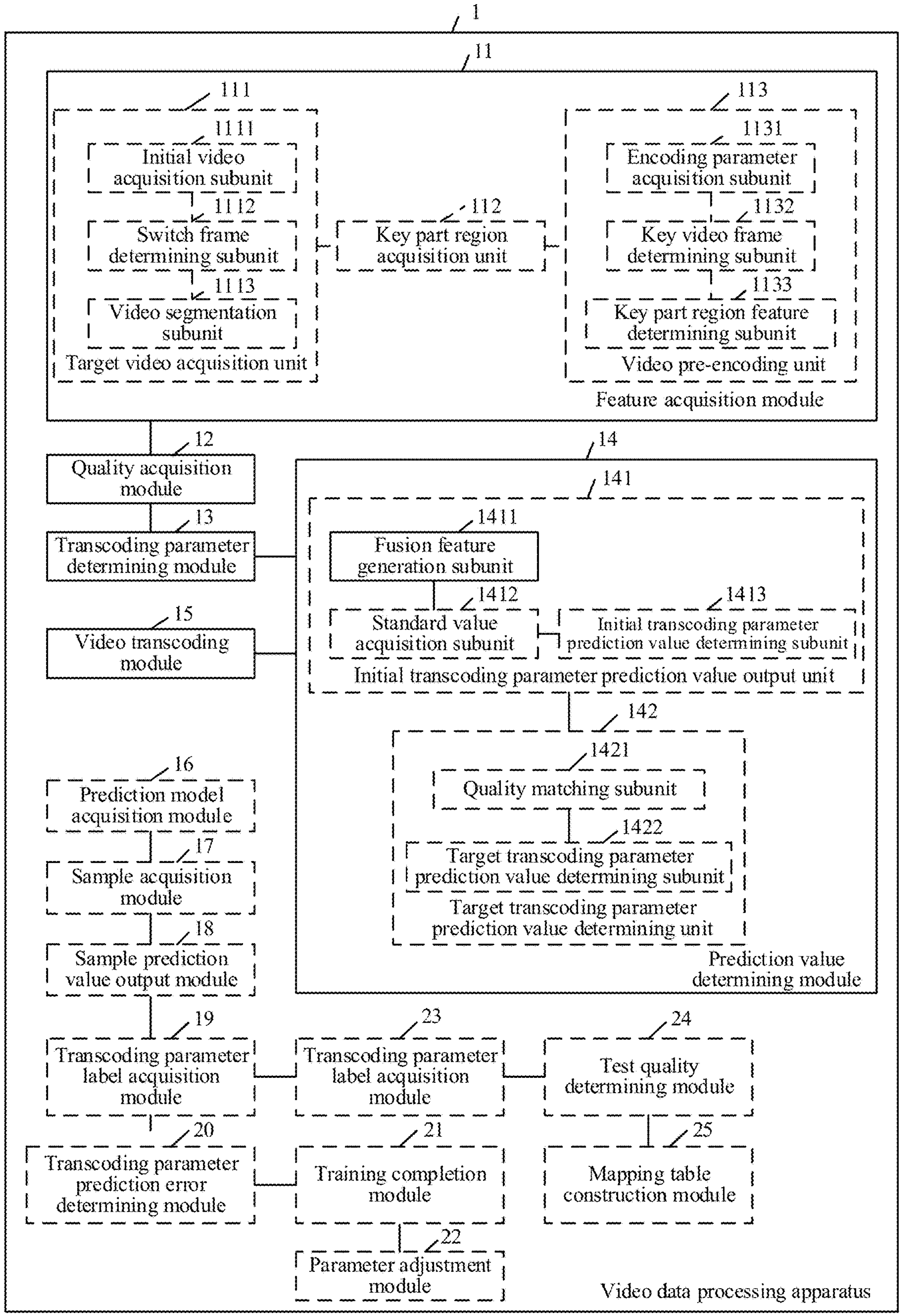
FIG. 11 is an exemplary schematic structural diagram of a video data processing apparatus according to an embodiment of this disclosure.

Refer to FIG. 11, which is an exemplary schematic structural diagram of a video data processing apparatus according to an embodiment of this disclosure. As shown in FIG. 11, the video data processing apparatus may include a computer program (including a program code) running in a computer device. For example, the video data processing apparatus may be implemented by application software. The apparatus may be used for performing the corresponding steps in the method provided by the embodiments of this disclosure. As shown in FIG. 11, the video data processing apparatus 1 may include: a feature acquisition module 11, a quality acquisition module 12, a transcoding parameter determining module 13, a prediction value determining module 14 and a video transcoding module 15. One or more modules, submodules, and/or units of the apparatus can be implemented by processing circuitry, software, or a combination thereof, for example.

The feature acquisition module 11 is configured to acquire video features of a target video, the video features including background features and key part region features.

The quality acquisition module 12 is configured to acquire an expected quality of a key part corresponding to the target video, the expected quality of the key part being: an expected value of an image quality of the key part in a transcoded target video after transcoding the target video.

Referring to FIG. 11, the feature acquisition module 11 may include: a target video acquisition unit 111, a key part region acquisition unit 112, and a video pre-encoding unit 113.

The target video acquisition unit 111 is configured to acquire the target video.

The key part region acquisition unit 112 is configured to acquire a key part region in the target video.

The video pre-encoding unit 113 is configured to pre-encode the target video according to a feature encoding parameter and the key part region to obtain the background features and the key part region features corresponding to the target video.

For exemplary implementations of the target video acquisition unit 111, the key part region acquisition unit 112, and the video pre-encoding unit 113, reference may be made to the description of step S201 and step S202 in the embodiment corresponding to FIG. 5. Details are not repeated herein again.

Referring to FIG. 11, the video pre-encoding unit 113 may include: an encoding parameter acquisition subunit 1131, a key video frame determining subunit 1132, and a key part region feature determining subunit 1133.

The encoding parameter acquisition subunit 1131 is configured to acquire the feature encoding parameter, and pre-encode the target video according to the feature encoding parameter to obtain the background features of the target video.

The key video frame determining subunit 1132 is configured to determine video frames including the key part region as key video frames in video frames of the target video.

The key part region feature determining subunit 1133 is configured to pre-encode the key video frames and the key part region according to the feature encoding parameter to obtain the key part region features of the target video.

The key part region feature determining subunit 1133 is further configured to pre-encode the key video frames according to the feature encoding parameter to obtain a basic attribute of the key video frames.

The key part region feature determining subunit 1133 is further configured to acquire the total number of the video frames of the target video, and the total number of the key video frames, and determine a key part frame number ratio of the total number of the video frames of the target video to the total number of the key video frames.

The key part region feature determining subunit 1133 is further configured to acquire the area of the key part region in a key video frame, and the total area of the key video frame, and determine a key part area ratio of the area of the key part region to the total area of the key video frame.

The key part region feature determining subunit 1133 is further configured to determine the basic attribute of the key video frames, the key part frame number ratio and the key part area ratio as the key part region features.

For exemplary implementations of the encoding parameter acquisition subunit 1131, the key video frame determining subunit 1132 and the key part region feature determining subunit 1133, reference may be made to the description of step S202 in the embodiment corresponding to FIG. 5. Details are not repeated herein again.

Referring to FIG. 11, the target video acquisition unit 111 may include: an initial video acquisition subunit 1111, a switch frame determining subunit 1112, and a video segmentation subunit 1113.

The initial video acquisition subunit 1111 is configured to acquire an initial video.

The switch frame determining subunit 1112 is configured to input the initial video into a segmentation encoder, and determine a scene switch frame of the initial video in the segmentation encoder.

The video segmentation subunit 1113 is configured to segment the initial video into video clips respectively corresponding to at least two different scenes according to the scene switch frame, and acquire a target video clip from the video clips as the target video.

For exemplary implementations of the initial video acquisition subunit 1111, the switch frame determining subunit 1112, and the video segmentation subunit 1113 reference may be made to the description of step S201 in the embodiment corresponding to FIG. 5. Details are not repeated herein again.

Referring to FIG. 11, the prediction value determining module 14 may include: an initial transcoding parameter prediction value output unit 141 and a target transcoding parameter prediction value determining unit 142.

The initial transcoding parameter prediction value output unit 141 is configured to input the background features, the key part region features and the background prediction transcoding parameter into a transcoding parameter prediction model, and output at least two initial transcoding parameter prediction values through the transcoding parameter prediction model, the initial transcoding parameter prediction values being corresponding to different key part quality standard values.

The target transcoding parameter prediction value determining unit 142 is configured to acquire the expected quality of the key part, and determine the target transcoding parameter prediction value corresponding to the expected quality of the key part according to a mapping relationship between the initial transcoding parameter prediction values and the key part quality standard values.

For exemplary implementations of the initial transcoding parameter prediction value output unit 141 and the target transcoding parameter prediction value determining unit 142, reference may be made to the description of step S104 in the embodiment corresponding to FIG. 3. Details are not repeated herein again.

Referring to FIG. 11, the initial transcoding parameter prediction value output unit 141 may include: a fusion feature generation subunit 1411, a standard value acquisition subunit 1412, and an initial transcoding parameter prediction value determining subunit 1413.

The fusion feature generation subunit 1411 is configured to input the background features, the key part region features and the background prediction transcoding parameter into a fully connected layer of the transcoding parameter prediction model, and generate a fusion feature in the fully connected layer.

The standard value acquisition subunit 1412 is configured to acquire a key part quality standard value set, the key part quality standard value set including at least two key part quality standard values.

The initial transcoding parameter prediction value determining subunit 1413 is configured to determine an initial transcoding parameter prediction value corresponding to each of the key part quality standard values according to the fusion feature.

For exemplary implementations of the fusion feature generation subunit 1411, the standard value acquisition subunit 1412, and the initial transcoding parameter prediction value determining subunit 1413, reference may be made to the description of step S104 in the embodiment corresponding to FIG. 3. Details are not repeated herein again.

Referring to FIG. 11, the target transcoding parameter prediction value determining unit 142 may include: a quality matching subunit 1421 and a target transcoding parameter prediction value determining subunit 1422.

The quality matching subunit 1421 is configured to match the expected quality of the key part with the key part quality standard value set.

The target transcoding parameter prediction value determining subunit 1422 is configured to, when there is a key part quality standard value that is the same as the expected quality of the key part in the key part quality standard value set, determine an initial transcoding parameter prediction value corresponding to the key part quality standard value that is the same as the expected quality of the key part in the at least two initial transcoding parameter prediction values as the target transcoding parameter prediction value according to the mapping relationship between the at least two initial transcoding parameter prediction values and the key part quality standard values.

The target transcoding parameter prediction value determining subunit 1422 is further configured to, when there is no key part quality standard value that is the same as the expected quality of the key part in the key part quality standard value set, determine a linear function according to the mapping relationship between the at least two initial transcoding parameter prediction values and the key part quality standard values, and determine the target transcoding parameter prediction value according to the linear function and the expected quality of the key part.

The target transcoding parameter prediction value determining subunit 1422 is further configured to acquire key part quality standard values greater than the expected quality of the key part in the key part quality standard value set, and determine a minimum key part quality standard value in the key part quality standard values greater than the expected quality of the key part.

The target transcoding parameter prediction value determining subunit 1422 is further configured to acquire key part quality standard values less than the expected quality of the key part in the key part quality standard value set, and determine a maximum key part quality standard value in the key part quality standard values less than the expected quality of the key part.

The target transcoding parameter prediction value determining subunit 1422 is further configured to determine an initial transcoding parameter prediction value corresponding to the maximum key part quality standard value, and an initial transcoding parameter prediction value corresponding to the minimum key part quality standard value according to the mapping relationship between the at least two initial transcoding parameter prediction values and the key part quality standard values.

The target transcoding parameter prediction value determining subunit 1422 is further configured to determine the linear function according to the maximum key part quality standard value, the initial transcoding parameter prediction value corresponding to the maximum key part quality standard value, the minimum key part quality standard value, and the initial transcoding parameter prediction value corresponding to the minimum key part quality standard value.

For exemplary implementations of the quality matching subunit 1421 and the target transcoding parameter prediction value determining subunit 1422, reference may be made to the description of step S104 in the embodiment corresponding to FIG. 3. Details are not repeated herein again.

Referring to FIG. 11, the video data processing apparatus 1 may include: a feature acquisition module 11, a quality acquisition module 12, a transcoding parameter determining module 13, a prediction value determining module 14, and a video transcoding module 15, and may further include: a prediction model acquisition module 16, a sample acquisition module 17, a sample prediction value output module 18, a transcoding parameter label acquisition module 19, a transcoding parameter prediction error determining module 20, a training completion module 21 and a parameter adjustment module 22. One or more modules, submodules, and/or units of the apparatus can be implemented by processing circuitry, software, or a combination thereof, for example.

The prediction model acquisition module 16 is configured to acquire a to-be-trained transcoding parameter prediction model.

The sample acquisition module 17 is configured to acquire sample video features of a sample video and a key part quality standard value set, the key part quality standard value set including at least two key part quality standard values.

The sample prediction value output module 18 is configured to input the sample video features into the transcoding parameter prediction model, and output sample initial transcoding parameter prediction values respectively corresponding to the at least two key part quality standard values through the transcoding parameter prediction model.

The transcoding parameter label acquisition module 19 is configured to acquire key part standard transcoding parameter labels respectively corresponding to the at least two key part quality standard values from a label mapping table.

The transcoding parameter prediction error determining module 20 is configured to determine a transcoding parameter prediction error according to the sample initial transcoding parameter prediction values and the key part standard transcoding parameter labels.

The training completion module 21 is configured to complete training of the transcoding parameter prediction model when the transcoding parameter prediction error satisfies a model convergence condition.

The parameter adjustment module 22 is configured to adjust model parameters in the transcoding parameter prediction model when the transcoding parameter prediction error does not satisfy the model convergence condition.

For exemplary implementations of the prediction model acquisition module 16, the sample acquisition module 17, the sample prediction value output module 18, the transcoding parameter label acquisition module 19, the transcoding parameter prediction error determining module 20, the training completion module 21 and the parameter adjustment module 22, reference may be made to the description of step S301 to step S307 in the embodiment corresponding to FIG. 6. Details are not repeated herein again.

Referring to FIG. 11, the video data processing apparatus 1 may include: a feature acquisition module 11, a quality acquisition module 12, a transcoding parameter determining module 13, a prediction value determining module 14, a video transcoding module 15, a prediction model acquisition module 16, a sample acquisition module 17, a sample prediction value output module 18, a transcoding parameter label acquisition module 19, a transcoding parameter prediction error determining module 20, a training completion module 21 and a parameter adjustment module 22, and may further include: a test transcoding parameter acquisition module 23, a test quality determining module 24 and a mapping table construction module 25. One or more modules, submodules, and/or units of the apparatus can be implemented by processing circuitry, software, or a combination thereof, for example.

The test transcoding parameter acquisition module 23 is configured to acquire a plurality of background test transcoding parameters and a plurality of key part test transcoding parameters.

The test quality determining module 24 is configured to input the sample video features into a label encoder, and encode the sample video features according to the plurality of background test transcoding parameters and the plurality of key part test transcoding parameters respectively in the label encoder, to obtain key part test qualities respectively corresponding to different key part test transcoding parameters under each of the background test transcoding parameters.

The mapping table construction module 25 is configured to construct a label mapping table according to a mapping relationship between the key part test qualities and the key part test transcoding parameters.

The mapping table construction module 25 is further configured to, when key part test qualities in the constructed label mapping table include the at least two key part quality standard values, determine key part test transcoding parameters corresponding to the at least two key part quality standard values in the label mapping table, and use the key part test transcoding parameters as the key part standard transcoding parameter labels; and when the key part test qualities in the constructed label mapping table do not include the at least two key part quality standard values, determine key part transcoding parameters corresponding to key part quality standard values and use the key part transcoding parameters as the key part standard transcoding parameter labels according to the key part test qualities and the key part test transcoding parameters in the constructed label mapping table.

For exemplary implementations of the test transcoding parameter acquisition module 23, the test quality determining module 24, and the mapping table construction module 25, reference may be made to the description of constructing the label mapping table in step S304 in the embodiment corresponding to FIG. 6. Details are not repeated herein again.

In this embodiment of this disclosure, by acquiring background features, key part region features, a background prediction transcoding parameter, and an expected quality of a key part of a target video, a target transcoding parameter prediction value matched with the expected quality of the key part can be obtained according to the background features, key part region features, and background prediction transcoding parameter of the target video. Because region-level features of the key part are newly added to take specific details of the key part region in the target video into consideration, a predicted target transcoding parameter prediction value can be more adapted to the key part region. Therefore, by transcoding the target video according to the target transcoding parameter prediction value, the quality of the key part region of the transcoded target video can satisfy the expected quality of the key part. That is, the quality of the key part region after the video transcoding can be improved.

Figure 12:
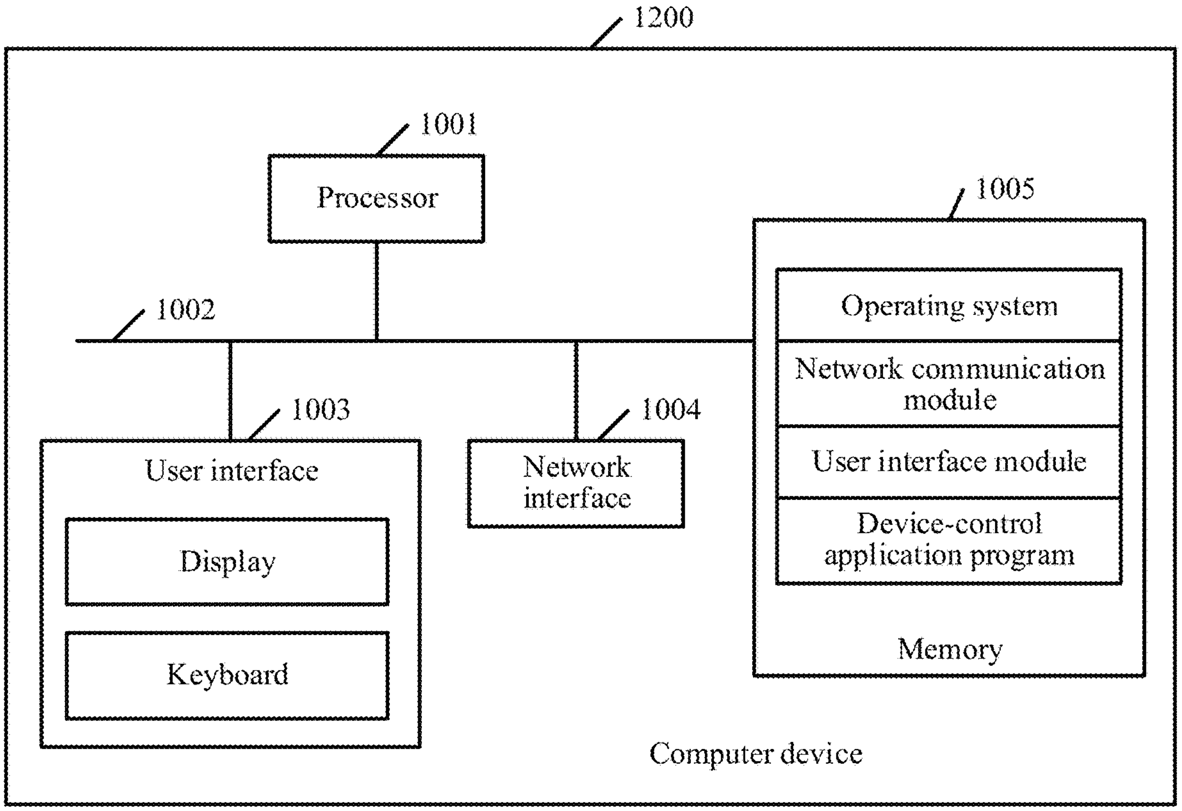
FIG. 12 is an exemplary schematic structural diagram of a computer device according to an embodiment of this disclosure.

Further, FIG. 12 is an exemplary schematic structural diagram of a computer device according to an embodiment of this disclosure. As shown in FIG. 12, the apparatus 1 in the embodiment corresponding to FIG. 11 may be applied to the computer device 1200. The computer device 1200 may include: processing circuitry (e.g., a processor 1001), a network interface 1004, and a memory 1005. In addition, the computer device 1200 further includes: a user interface 1003 and at least one communication bus 1002. The communication bus 1002 is configured to implement connection and communication between the components. The user interface 1003 may include a display, a keyboard, and optionally, the user interface 1003 may further include a standard wired interface and a standard wireless interface. The network interface 1004 may include a standard wired interface and a standard wireless interface (e.g., a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 12, the memory 1005 used as a computer-readable storage medium may include an operating system, a network communication module, a user interface module, and a device-control application program.

In the computer device 1200 shown in FIG. 12, the network interface 1004 may provide a network communication function; the user interface 1003 is mainly configured to provide an input interface for a user; and the processor 1001 may be configured to invoke a device-control application program stored in the memory 1005 to:

acquire video features of a target video, the video features including background features and key part region features;

acquire an expected quality of a key part corresponding to the target video;

determine a background prediction transcoding parameter of the target video based on the background features;

determine a target transcoding parameter prediction value matched with the expected quality of the key part according to the background features, the key part region features and the background prediction transcoding parameter; and transcode the key part region in the target video according to the target transcoding parameter prediction value.

It is to be understood that, the computer device 1200 described in this embodiment of this disclosure may implement the description of the video data processing method in the foregoing embodiments corresponding to FIG. 3 to FIG. 10, and may also implement the description of the video data processing apparatus 1 in the foregoing embodiment corresponding to FIG. 11. Details are not described herein again. In addition, the description of beneficial effects of the same method are not described herein again.

In addition, the embodiments of this disclosure further provide a computer-readable storage medium, such as a non-transitory computer-readable storage medium. The computer-readable storage medium stores a computer program executed by the computer device 1200 for video data processing, and the computer program includes program instructions. When executing the program instructions, the processor may perform the description of the video data processing method in the foregoing embodiments corresponding to FIG. 3 to FIG. 10. Therefore, details are not described herein again. In addition, the description of beneficial effects of the same method are not described herein again. For technical details that are not disclosed in the embodiments of the computer-readable storage medium of this disclosure, reference is made to the method embodiments of this disclosure.

The computer-readable storage medium may be an internal storage unit of the video data processing apparatus or the computer device provided in any one of the foregoing embodiments, for example, a hard disk or a memory of the computer device. The computer-readable storage medium may alternatively be an external storage device of the computer device, for example, a pluggable hard disk equipped on the computer device, a smart media card (SMC), a secure digital (SD) card, a flash card, or the like. Further, the computer-readable storage medium may include both an internal storage unit and an external storage device of the computer device. The computer-readable storage medium is configured to store the computer program and another program and data that are required by the computer device. The computer-readable storage medium may be further configured to temporarily store data that has been outputted or data to be outputted.

In the specification, claims, and accompanying drawings of this disclosure, the terms such as “first”, and “second” of the embodiments of this disclosure are intended to distinguish between different objects but do not indicate a particular order. In addition, the terms “include” and any variant thereof are intended to cover a non-exclusive inclusion. For example, a process, method, apparatus, product, or device that includes a series of steps or modules is not limited to the listed steps or modules; and instead, further optionally includes a step or module that is not listed, or further optionally includes another step or unit that is intrinsic to the process, method, apparatus, product, or device.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

A person of ordinary skill in the art may be aware that the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this disclosure.

The methods and related apparatuses provided by the embodiments of this disclosure are described with reference to the method flowcharts and/or schematic structural diagrams provided in the embodiments of this disclosure. Specifically, each process of the method flowcharts and/or each block of the schematic structural diagrams, and a combination of processes in the flowcharts and/or blocks in the block diagrams can be implemented by computer program instructions. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the schematic structural diagrams. These computer program instructions may also be stored in a computer readable memory that can guide a computer or another programmable data processing device to work in a specified manner, so that the instructions stored in the computer readable memory generate a product including an instruction apparatus, where the instruction apparatus implements functions specified in one or more processes in the flowcharts and/or one or more blocks in the schematic structural diagrams. The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

The foregoing disclosure includes some exemplary embodiments of this disclosure, and is not intended to limit the protection scope of this disclosure. Other embodiments shall also fall within the scope of this disclosure.

What is claimed is:

1. A video data processing method, comprising:

acquiring video features of a target video, the video features including background features and key part region features;

acquiring an expected quality of a key part of the target video, the expected quality of the key part corresponding to an image quality of the key part in a transcoded target video after the target video is transcoded;

determining a background prediction transcoding parameter of the target video based on the background features;

inputting the background features, the key part region features, and the background prediction transcoding parameter into a transcoding parameter prediction model;

receiving an initial transcoding parameter prediction value that is output by the transcoding parameter prediction model according to the input of the background features, the key part region features, and the background prediction transcoding parameter;

determining, by processing circuitry, a target transcoding parameter prediction value based on the initial transcoding parameter prediction value; and transcoding the target video according to the target transcoding parameter prediction value.

2. The video data processing method according to claim 1, wherein the acquiring the video features comprises:

determining a key part region in the target video; and pre-encoding the target video according to a feature encoding parameter and the key part region to obtain the background features and the key part region features corresponding to the target video.

3. The video data processing method according to claim 2, wherein the background features include at least one of a resolution, a bit rate, a frame rate, a reference frame, a peak signal to noise ratio (PSNR), a structural similarity index (SSIM), or video multi-method assessment fusion (VMAF); and the key part region features include at least one of a PSNR of the key part region, an SSIM of the key part region, VMAF of the key part region, a key part frame number ratio of a number of key video frames in which the key part appears to a total number of video frames, a key part area ratio of an area of the key part region in a key video frame in which the key part appears to a total area of the key video frame, or an average bit rate of the key part region.

4. The video data processing method according to claim 2, wherein the pre-encoding comprises:

determining video frames of the target video that include the key part region as key video frames of the target video; and pre-encoding the key video frames and the key part region according to the feature encoding parameter to obtain the key part region features of the target video.

5. The video data processing method according to claim 4, wherein the pre-encoding the key video frames and the key part region comprises:

pre-encoding a key frame of the key video frames according to the feature encoding parameter to obtain a basic attribute of the key video frame;

determining a key part frame number ratio based on a total number of the video frames of the target video to a total number of the key video frames; and determining a key part area ratio based on an area of the key part region and a total area of the key video frame, and the key part region features include the basic attribute of the key video frame, the key part frame number ratio, and the key part area ratio.

6. The video data processing method according to claim 2, wherein the acquiring the video features comprises:

acquiring an initial video;

inputting the initial video into a segmentation encoder;

determining a scene switch frame of the initial video in the segmentation encoder;

segmenting the initial video into video clips respectively corresponding to at least two different scenes according to the scene switch frame; and acquiring a target video clip from the video clips as the target video.

7. The video data processing method according to claim 1, wherein the determining the target transcoding parameter prediction value comprises:

outputting at least two initial transcoding parameter prediction values through the transcoding parameter prediction model, the at least two initial transcoding parameter prediction values corresponding to different key part quality standard values and including the initial transcoding parameter prediction value; and determining the target transcoding parameter prediction value corresponding to the expected quality of the key part according to a mapping relationship between the at least two initial transcoding parameter prediction values and the key part quality standard values.

8. The video data processing method according to claim 7, wherein the inputting includes inputting the background features, the key part region features, and the background prediction transcoding parameter into a fully connected layer of the transcoding parameter prediction model, the fully connected layer being configured to generate a fusion feature; and determining an initial transcoding parameter prediction value corresponding to each key part quality standard value of a key part quality standard value set according to the fusion feature.

9. The video data processing method according to claim 8, wherein the determining the target transcoding parameter prediction value comprises:

matching the expected quality of the key part with the key part quality standard value set;

when the expected quality of the key part is included in the key part quality standard value set, determining an initial transcoding parameter prediction value corresponding to the expected quality of the key part in the at least two initial transcoding parameter prediction values as the target transcoding parameter prediction value according to the mapping relationship between the at least two initial transcoding parameter prediction values and the key part quality standard values; and when the expected quality of the key part is not included in the key part quality standard value set, determining a linear function according to the mapping relationship between the at least two initial transcoding parameter prediction values and the key part quality standard values, and determining the target transcoding parameter prediction value according to the linear function and the expected quality of the key part.

10. The video data processing method according to claim 9, wherein the determining the linear function comprises:

determining a minimum key part quality standard value in the key part quality standard values that is greater than the expected quality of the key part;

determining a maximum key part quality standard value in the key part quality standard values that is less than the expected quality of the key part;

determining an initial transcoding parameter prediction value corresponding to the maximum key part quality standard value, and an initial transcoding parameter prediction value corresponding to the minimum key part quality standard value according to the mapping relationship between the at least two initial transcoding parameter prediction values and the key part quality standard values; and determining the linear function according to the maximum key part quality standard value, the initial transcoding parameter prediction value corresponding to the maximum key part quality standard value, the minimum key part quality standard value, and the initial transcoding parameter prediction value corresponding to the minimum key part quality standard value.

11. The video data processing method according to claim 1, further comprising:

acquiring sample video features of a sample video and a key part quality standard value set, the key part quality standard value set including at least two key part quality standard values;

inputting the sample video features into the transcoding parameter prediction model, and outputting sample initial transcoding parameter prediction values respectively corresponding to the at least two key part quality standard values through the transcoding parameter prediction model;

acquiring key part standard transcoding parameter labels respectively corresponding to the at least two key part quality standard values from a label mapping table;

determining a transcoding parameter prediction error according to the sample initial transcoding parameter prediction values and the key part standard transcoding parameter labels;

completing training of the transcoding parameter prediction model when the transcoding parameter prediction error satisfies a model convergence condition; and adjusting model parameters in the transcoding parameter prediction model when the transcoding parameter prediction error does not satisfy the model convergence condition.

12. The video data processing method according to claim 11, further comprising:

acquiring a plurality of background test transcoding parameters and a plurality of key part test transcoding parameters;

inputting the sample video features into a label encoder, and encoding the sample video features according to the plurality of background test transcoding parameters and the plurality of key part test transcoding parameters respectively in the label encoder, to obtain key part test qualities respectively corresponding to different key part test transcoding parameters under each of the background test transcoding parameters; and constructing the label mapping table according to a mapping relationship between the key part test qualities and the key part test transcoding parameters.

13. The video data processing method according to claim 12, wherein when key part test qualities in the constructed label mapping table include the at least two key part quality standard values, key part test transcoding parameters corresponding to the key part quality standard values in the label mapping table are determined, and the key part test transcoding parameters are used as the key part standard transcoding parameter labels; and when the key part test qualities in the constructed label mapping table do not include the at least two key part quality standard values, the key part transcoding parameters corresponding to the key part quality standard values are determined and used as the key part standard transcoding parameter labels according to the key part test qualities and the key part test transcoding parameters in the constructed label mapping table.

14. A video data processing apparatus, comprising:

processing circuitry configured to:

acquire video features of a target video, the video features including background features and key part region features;

acquire an expected quality of a key part of the target video, the expected quality of the key part corresponding to an image quality of the key part in a transcoded target video after the target video is transcoded;

determine a background prediction transcoding parameter of the target video based on the background features;

input the background features, the key part region features, and the background prediction transcoding parameter into a transcoding parameter prediction model;

receive an initial transcoding parameter prediction value that is output by the transcoding parameter prediction model according to the input of the background features, the key part region features, and the background prediction transcoding parameter;

determine a target transcoding parameter prediction value based on the initial transcoding parameter prediction value; and transcode the target video according to the target transcoding parameter prediction value.

15. The video data processing apparatus according to claim 14, wherein the processing circuitry is configured to:

determine a key part region in the target video; and pre-encode the target video according to a feature encoding parameter and the key part region to obtain the background features and the key part region features corresponding to the target video.

16. The video data processing apparatus according to claim 15, wherein the background features include at least one of a resolution, a bit rate, a frame rate, a reference frame, a peak signal to noise ratio (PSNR), a structural similarity index (SSIM), or video multi-method assessment fusion (VMAF); and the key part region features include at least one of a PSNR of the key part region, an SSIM of the key part region, VMAF of the key part region, a key part frame number ratio of a number of key video frames in which the key part appears to a total number of video frames, a key part area ratio of an area of the key part region in a key video frame in which the key part appears to a total area of the key video frame, or an average bit rate of the key part region.

17. The video data processing apparatus according to claim 15, wherein the processing circuitry is configured to:

determine video frames of the target video that include the key part region as key video frames of the target video; and pre-encode the key video frames and the key part region according to the feature encoding parameter to obtain the key part region features of the target video.

18. The video data processing apparatus according to claim 17, wherein the processing circuitry is configured to:

pre-encode a key frame of the key video frames according to the feature encoding parameter to obtain a basic attribute of the key video frame;

determine a key part frame number ratio based on a total number of the video frames of the target video to a total number of the key video frames; and determine a key part area ratio based on an area of the key part region and a total area of the key video frame, and the key part region features include the basic attribute of the key video frame, the key part frame number ratio, and the key part area ratio.

19. The video data processing apparatus according to claim 15, wherein the processing circuitry is configured to:

acquire an initial video;

input the initial video into a segmentation encoder;

determine a scene switch frame of the initial video in the segmentation encoder;

segment the initial video into video clips respectively corresponding to at least two different scenes according to the scene switch frame; and acquire a target video clip from the video clips as the target video.

20. A non-transitory computer-readable storage medium, storing instructions which when executed by a processor, causing the processor to perform:

acquiring video features of a target video, the video features including background features and key part region features;

acquiring an expected quality of a key part of the target video, the expected quality of the key part corresponding to an image quality of the key part in a transcoded target video after the target video is transcoded;

determining a background prediction transcoding parameter of the target video based on the background features;

inputting the background features, the key part region features, and the background prediction transcoding parameter into a transcoding parameter prediction model;

receiving an initial transcoding parameter prediction value that is output by the transcoding parameter prediction model according to the input of the background features, the key part region features, and the background prediction transcoding parameter;

determining a target transcoding parameter prediction value based on the initial transcoding parameter prediction value; and transcoding the target video according to the target transcoding parameter prediction value.

* * * * *